April 24, 1934.     G. E. ROWE     1,956,203
METHOD OF AND APPARATUS FOR FORMING HOLLOW GLASSWARE
Filed Aug. 31, 1931     12 Sheets-Sheet 1

Witness:
Jas. G. White

Inventor;
George E. Rowe
By Brown & Parham
Attorneys.

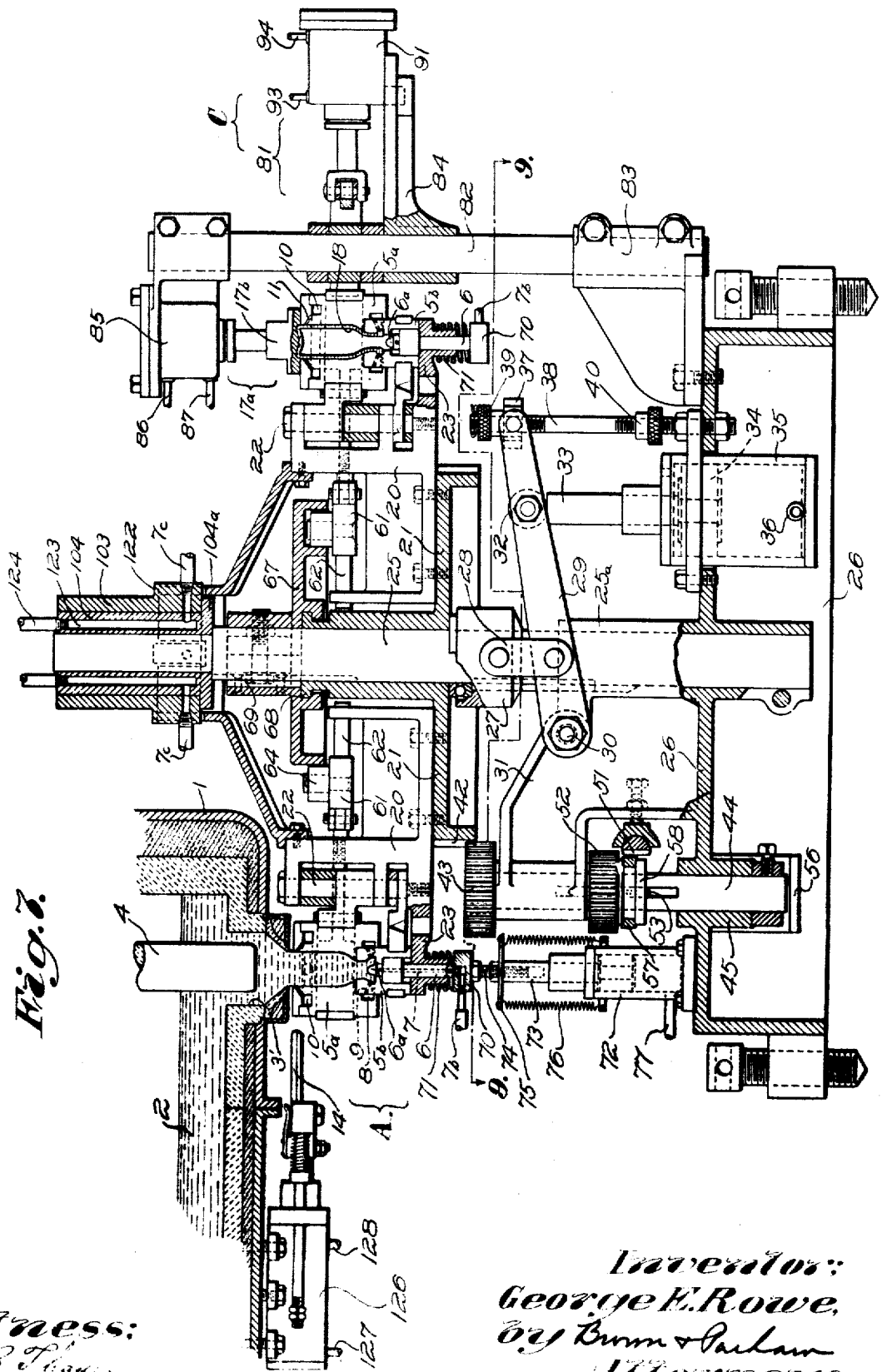

April 24, 1934.  G. E. ROWE  1,956,203
METHOD OF AND APPARATUS FOR FORMING HOLLOW GLASSWARE
Filed Aug. 31, 1931   12 Sheets-Sheet 3
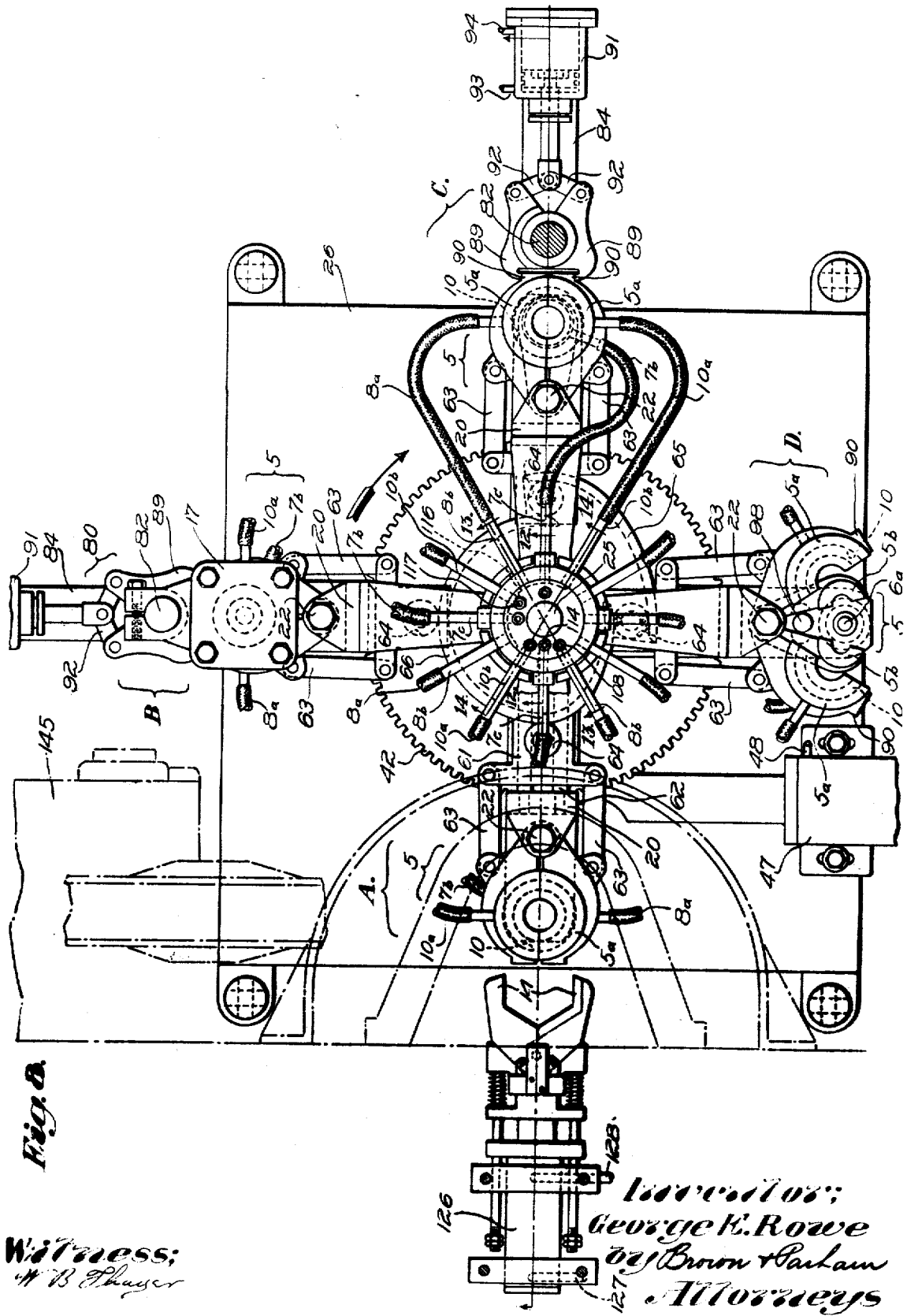

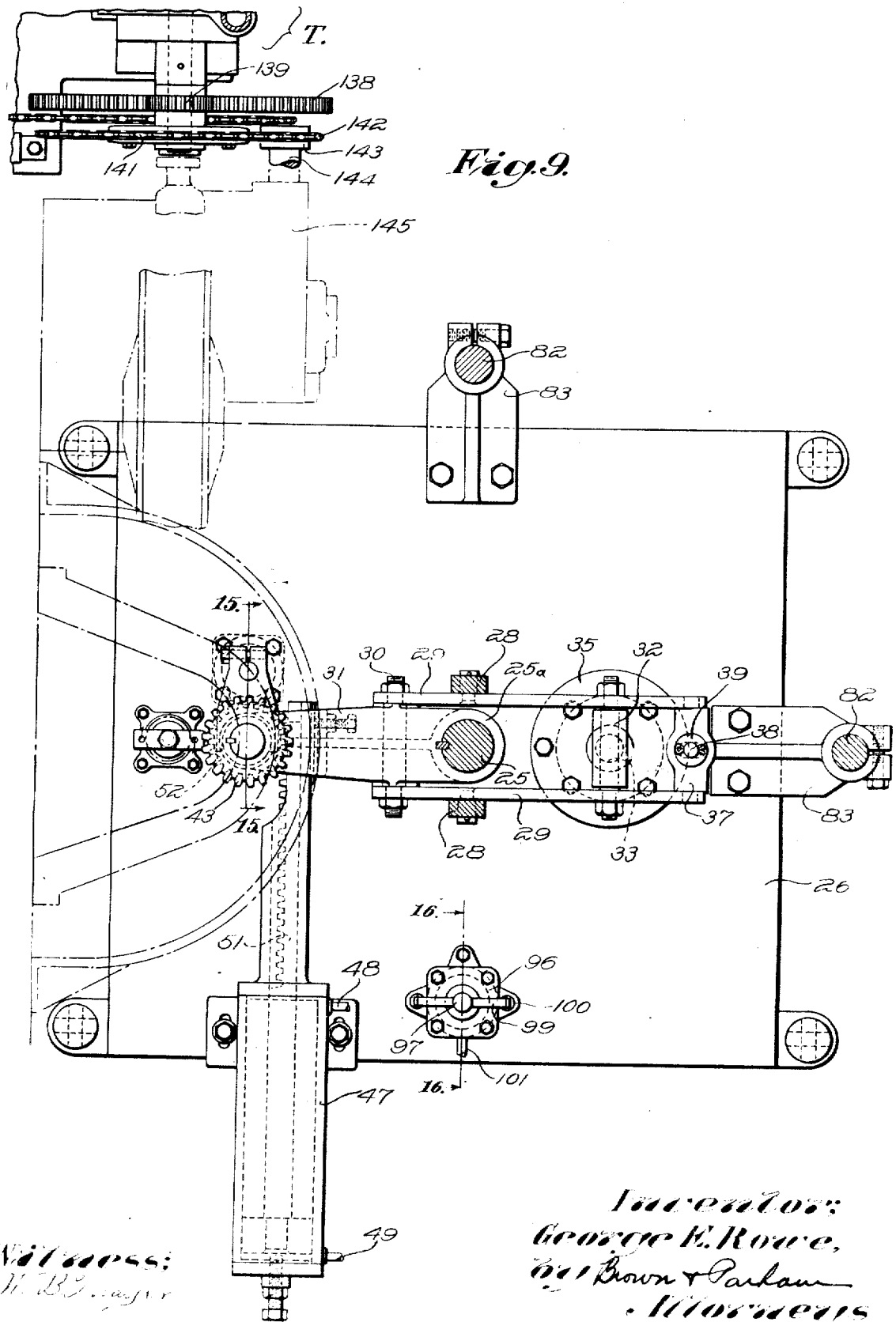

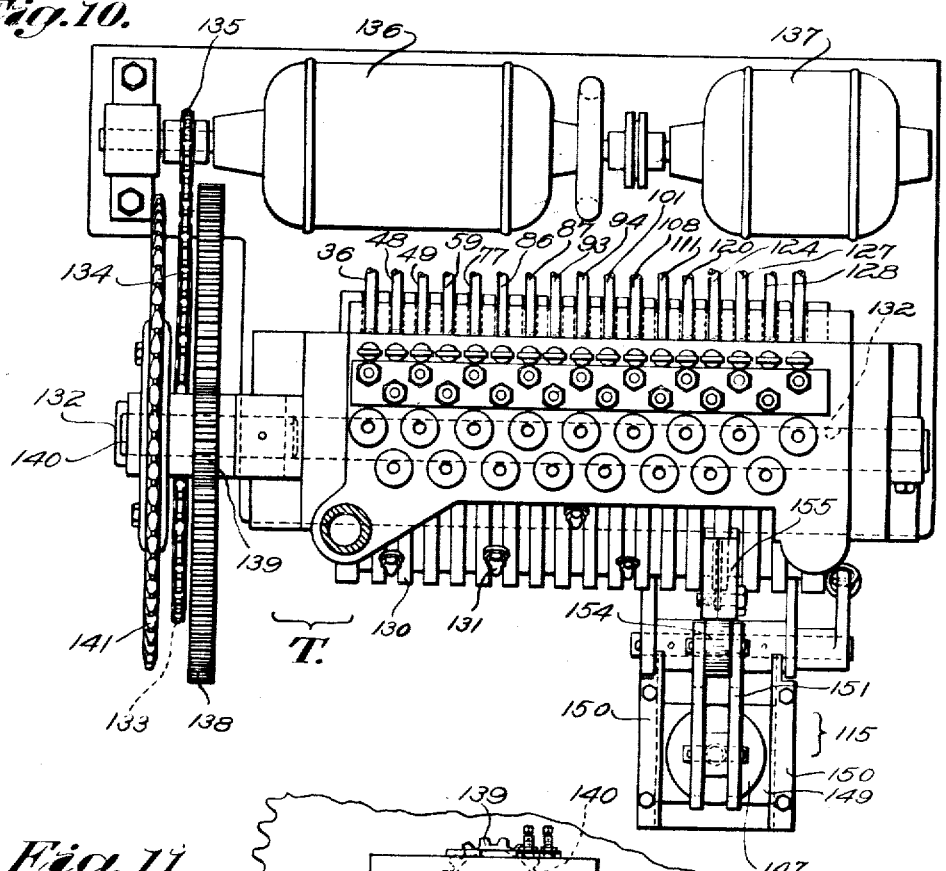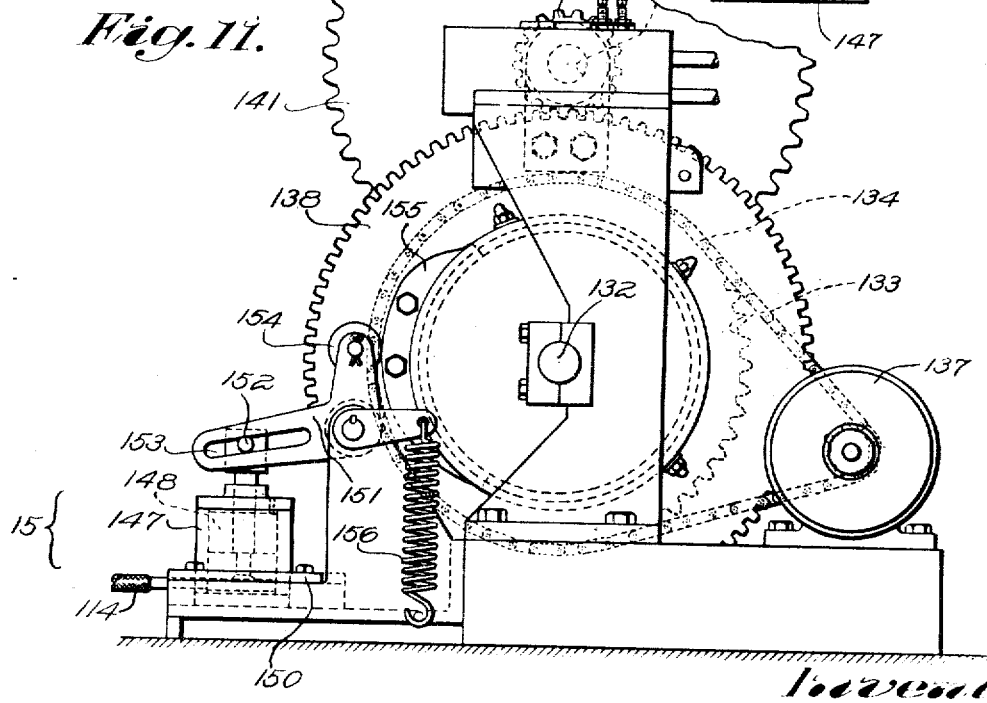

April 24, 1934.  G. E. ROWE  1,956,203
METHOD OF AND APPARATUS FOR FORMING HOLLOW GLASSWARE
Filed Aug. 31, 1931  12 Sheets-Sheet 6
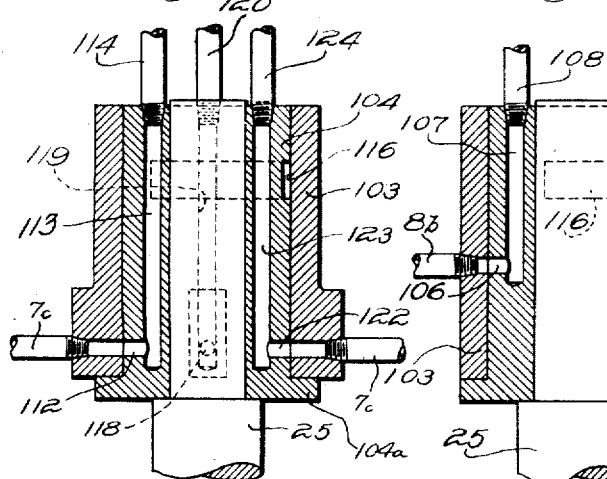
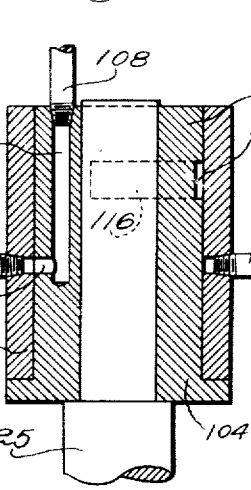
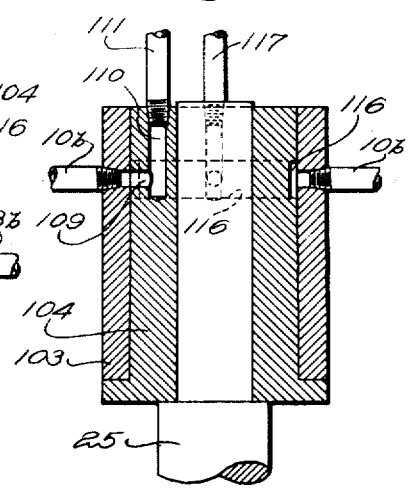
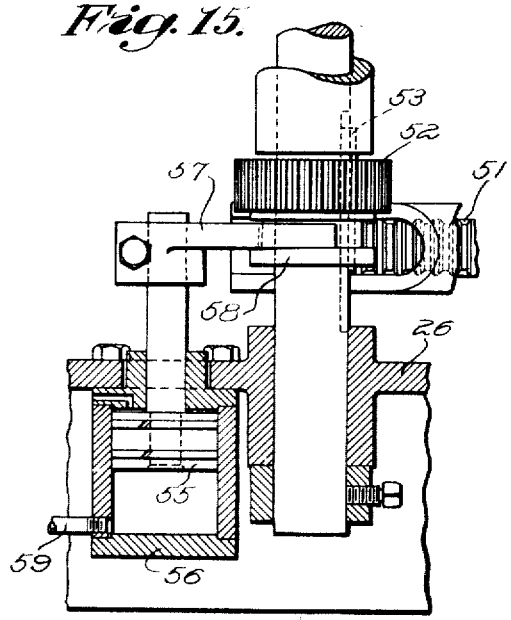
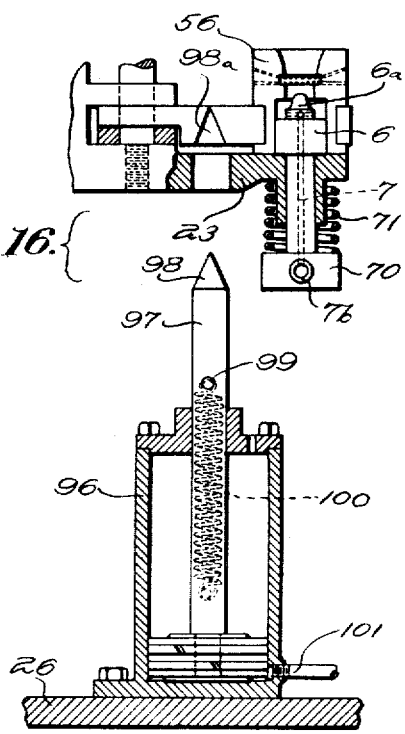
Inventor:
George E. Rowe
by Brown & Parham
Attorneys
Witness:
W. B. Thayer

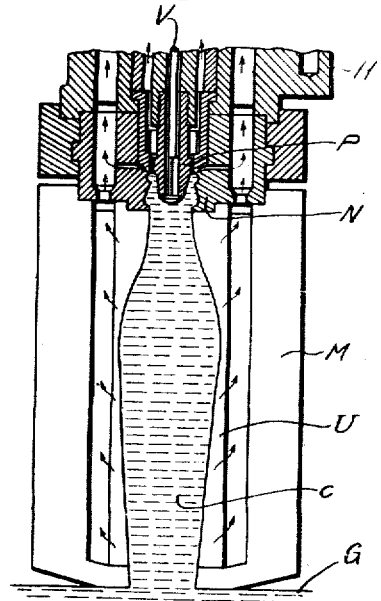
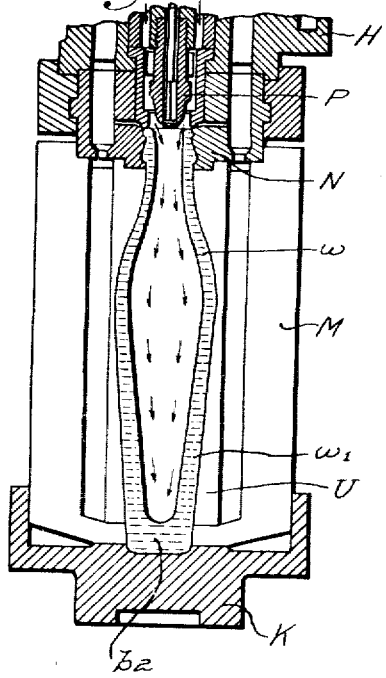
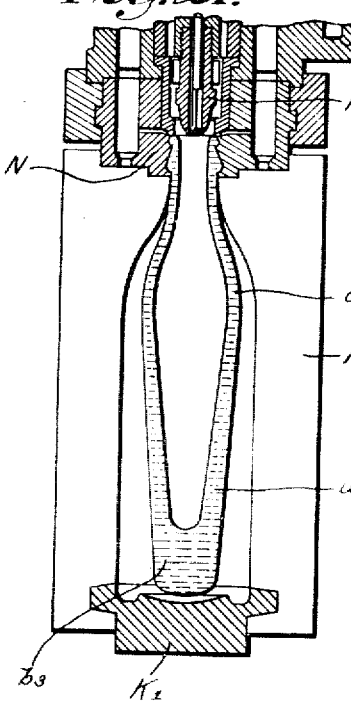
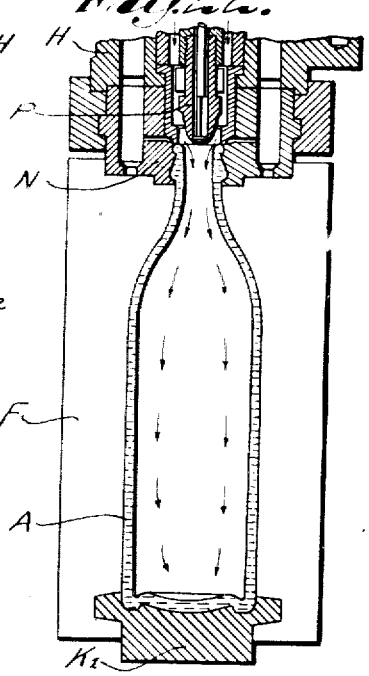

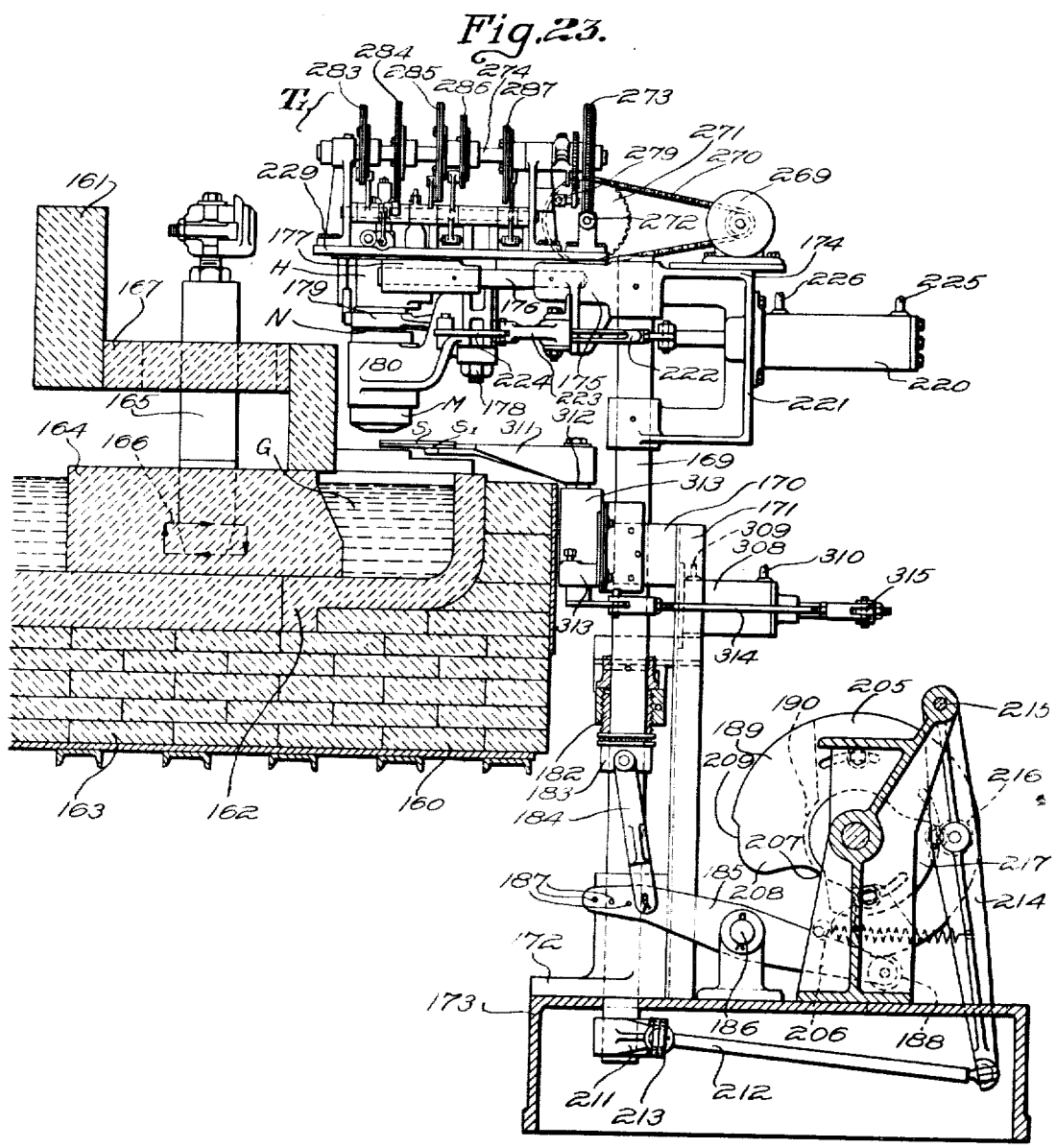

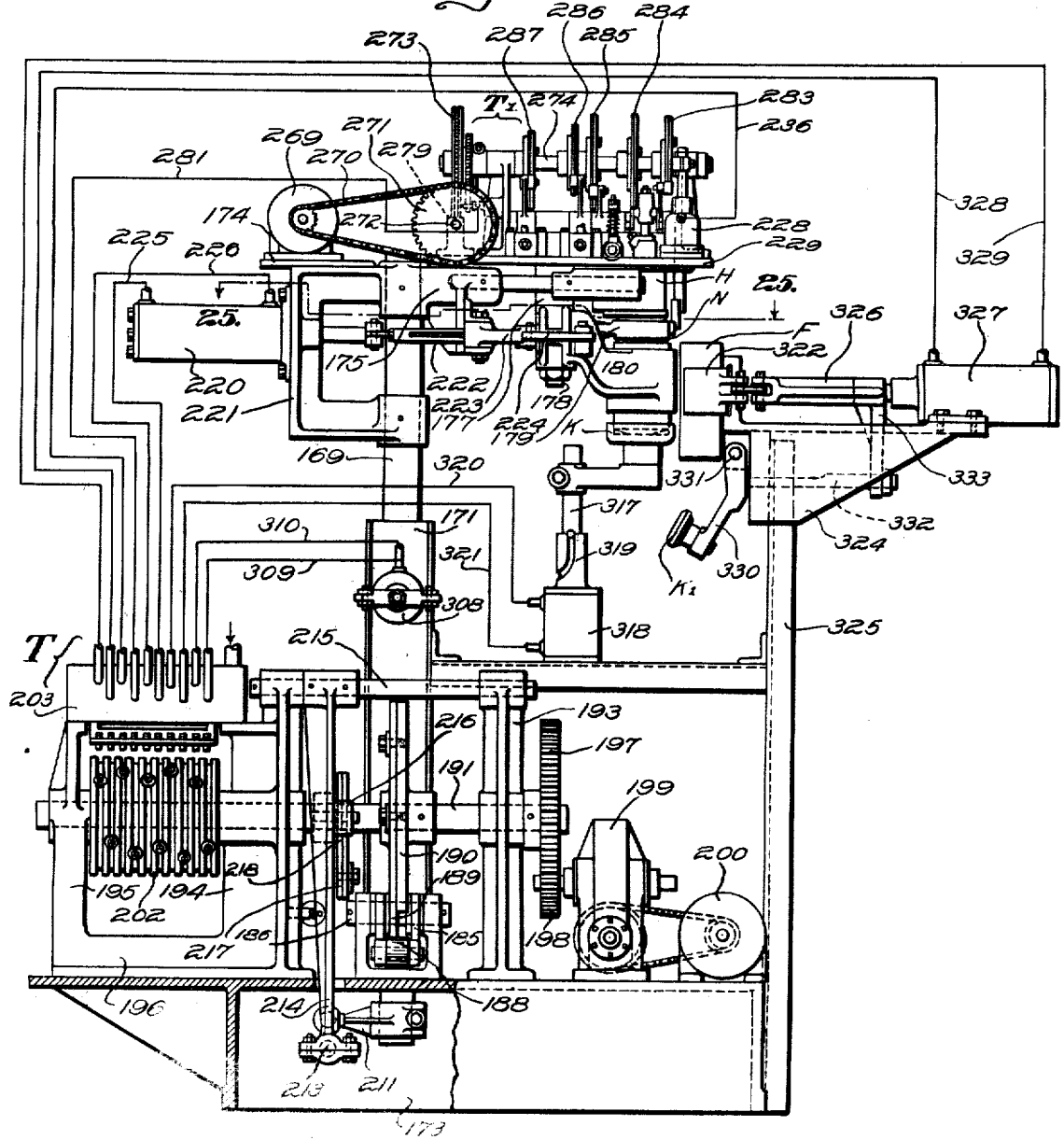

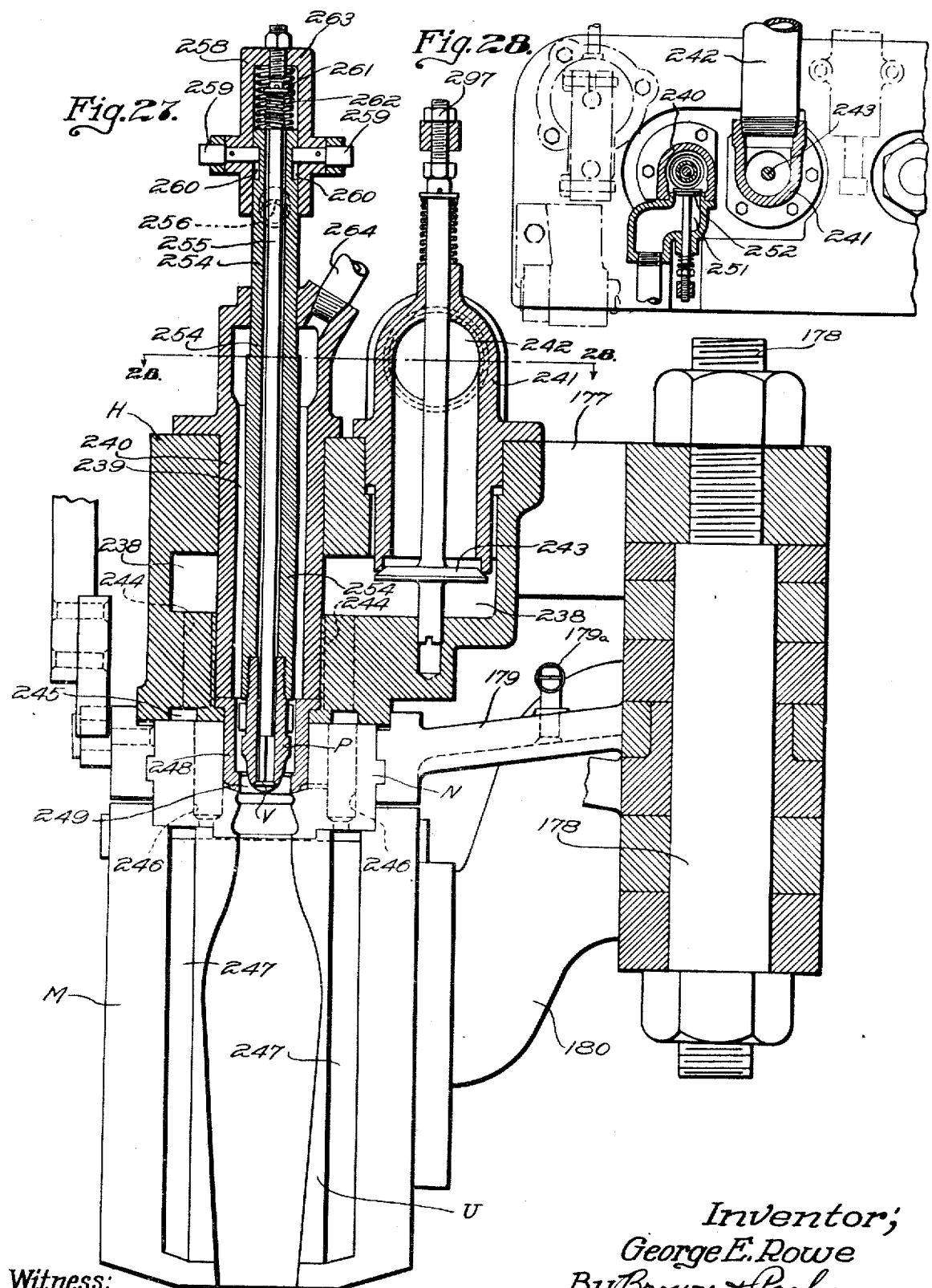

April 24, 1934.  G. E. ROWE  1,956,203
METHOD OF AND APPARATUS FOR FORMING HOLLOW GLASSWARE
Filed Aug. 31, 1931  12 Sheets-Sheet 12
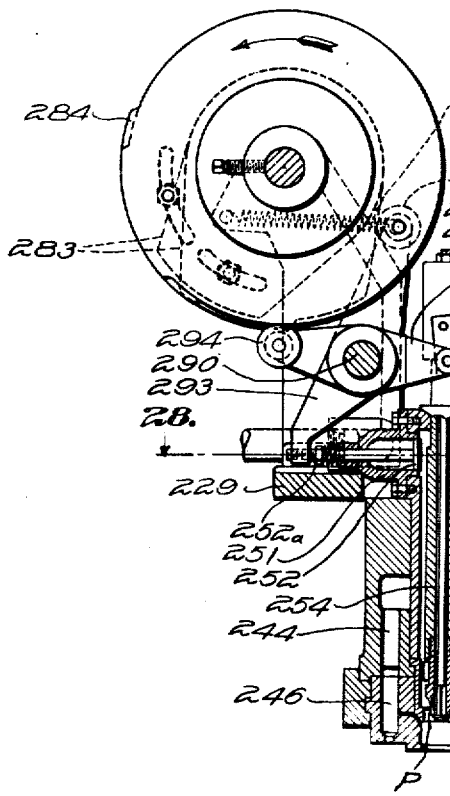
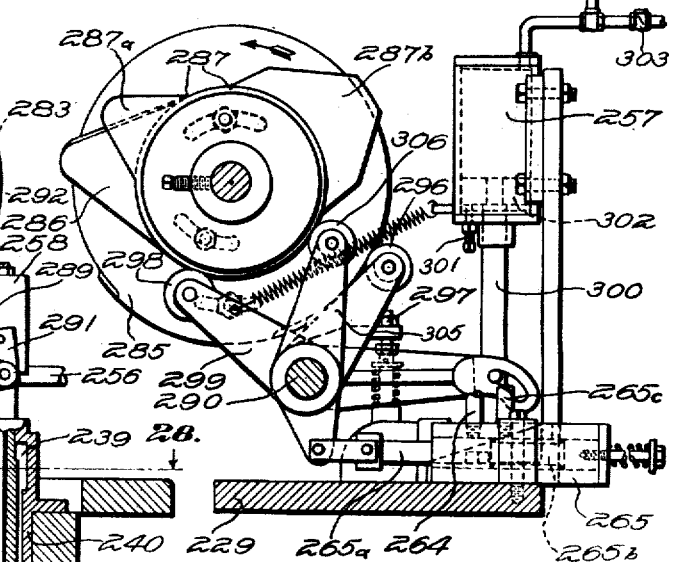
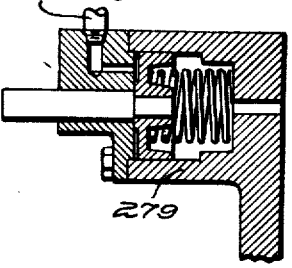
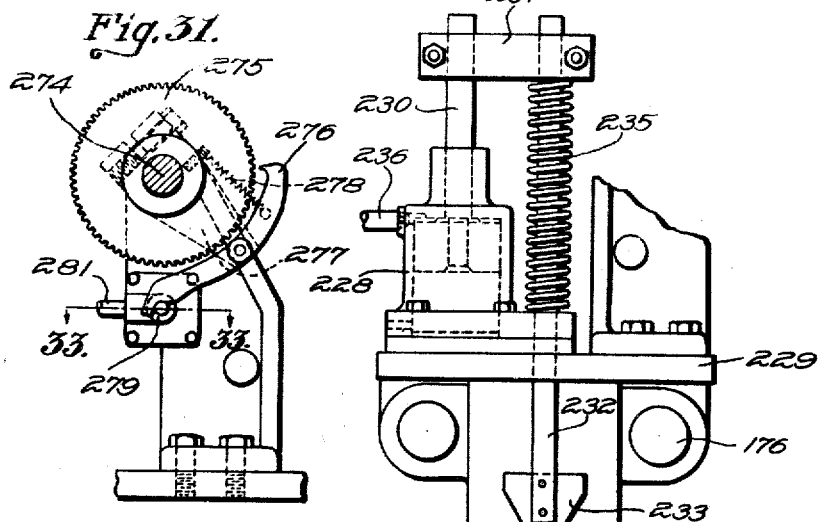
Witness:
Jas. G. White
Inventor;
George E. Rowe
By Brown + Parham
Attorneys.

Patented Apr. 24, 1934

1,956,203

UNITED STATES PATENT OFFICE

1,956,203

METHOD OF AND APPARATUS FOR FORMING HOLLOW GLASSWARE

George E. Rowe, West Hartford, Conn., assignor to Hartford-Empire Company, Hartford, Conn., a corporation of Delaware Application August 31, 1931, Serial No. 560,320

24 Claims. (Cl. 49—5)

This invention relates to the art of fabricating hollow glassware of the character in which articles of glassware are completed by blowing pre-shaped glass.

More specifically, the invention relates to methods of, and apparatus for, pre-shaping and/or pre-conditioning charges or bodies of glass from which finished hollow articles may be formed by blowing, and provides a novel method which, for reasons set forth below, I call the Fill and Empty method of making hollow glassware.

This application is a continuation in part of my copending application, Ser. No. 396,244, filed Sept. 30, 1929. It is filed for the purpose of further illustrating the mode of employing the method, and additional convenient embodiments of the apparatus, both disclosed in the aforesaid copending application.

Among the methods which have been employed prior to my invention are the "feeder" method and the "suction" method. The two methods possess common features. In both of them the glass is shaped into parisons in parison mold units, the parisons thus formed being blown to final shape in separate finishing molds. Neck molds and neck pins ordinarily are associated with the parison molds to shape the necks of the finished articles during the parison forming operation. The two methods differ primarily in the procedures according to which the molten glass is supplied to, and shaped in, the parison mold units, and the effects of the respective procedure upon the finish blowing of the parisons and resulting characteristics of the blown ware, such as the distribution of the glass therein, and the appearance of the ware.

Glassware made by the "feeder" method, while ordinarily possessing "good general distribution", sometimes is objectionable in its optical appearance because of waviness therein, typified by the well known "settle wave".

By "good general distribution" is meant the least difference between minimum and maximum thickness of wall section (especially from side to side) of a given finished hollow article, and hence the maximum strength with a minimum amount of glass, due to the glass being sufficiently thick in its thinnest part.

On the other hand, glassware made by the suction method usually has good optical appearance (freedom from waviness) but sometimes has poor general distribution as manifested by the marked eccentricity of inner and outer walls, thin shoulders, etc.

Thus, the advantage of good general distribution and minimum consumption of glass for maximum strength, when the ware is produced according to the "feeder" method, may be offset to greater or less extent by the relatively poor optical appearance of the ware; the advantage of good optical apearance of glassware made by the suction method may be reduced by faulty general distribution and low strength, or excessive glass consumption.

It is the general object of this invention to provide a novel method of manufacturing hollow glassware by the employment of which better and more uniform distribution of glass in the ware is effected, and glassware produced of materially better quality, than is possible according to any of the methods heretofore proposed.

In the realization of the above object, difficulties in the old practices, and the defects in finished glassware due to causes inherent in such practices, may be largely if not entirely avoided while at the same time, separate or combined advantages of such practices, and additional benefits, may be obtained, and a simpler, more efficient, and more economical mode of procedure may be provided.

A further object of the invention is to provide a novel method of producing hollow glassware free, or substantially free, from both local and general non-uniformity in distribution; which possesses both an optical appearance equal to, or better than, that of previously manufactured ware, and in which the difference between minimum and maximum thickness (especially from side to side) is materially less than in hollow glassware heretofore produced (or such difference is eliminated), and which method consequently may require less consumption of glass in proportion to the strength of the finished ware.

Other objects of the invention are to provide a novel method of the above character which may be practiced either by completely shaping each article in a single mold unit, or in a plurality of mold units such as a parison mold and a finishing mold; which may be performed either by supplying the glass downwardly to an inverted mold, as from a feeder, or by charging the mold right-side-up as by suction, or in any other approved or known manner; and which may be employed for manufacturing a large variety of sizes and/or shapes of hollow glassware.

It also is an object of the invention to provide novel apparatus by which the novel method of the invention may be practiced.

Additional objects and advantages of the invention will be pointed out in the more detailed description of the invention which follows, or will become apparent from such description.

Broadly considered, the invention may be said to be based upon the discovery that highly useful hollow glass bodies of novel character, and of remarkable and beneficial physical properties, may be manufactured by shaping and chilling the exterior of a substantially solid (imperforate) body or quota of glass; and making the body or quota hollow by removing substantially unchilled glass of relatively low viscosity from within the shaped and chilled exterior glass, and disconnecting it therefrom.

In accordance with the above principles, a hollow body may be formed by substantially filling a mold with glass, or with a body or quota of glass, such glass preferably being externally shaped, and chilled on or near its surface, by the mold wall, as, or immediately after, it is introduced into the mold. The body thus formed and treated may be made hollow, as for example, by the application of centrally directed force at an appropriate time after the mold is charged, that serving to expel or empty interior substantially unchilled glass from within the chilled exterior, leaving a cavity in the latter of a size depending upon the quantity of interior glass so expelled. Air pressure may be employed to exert the force and at the time that it is applied, the chilled exterior of the body may be held substantially in contact with the mold wall, by such pressure and if desired by means of vacuum, to preserve its original or initial external shape. After the proper or desired amount of glass is expelled, it may be severed from the hollow body which remains. The hollow body then may be completed either prior to or after its removal from the mold in which it is formed, as by shaping its bottom, as desired.

In the above manner, either a finished article or a parison or blank to be blown to final form in a separate finishing mold, or otherwise, may be produced. In either case, a neck mold with a neck pin projecting therethrough, may if desired, be associated with the mold previously referred to, for finishing a neck on the hollow body and forming an initial blowing cavity therein at the time that the glass is introduced into the main mold. But the finishing of a neck on the hollow body is not essential and may be omitted altogether in making certain types of glassware. Due to the fact that my novel method involves the steps of filling or charging a mold with glass and then expelling or emptying some of the glass from the mold, I call it the Fill and Empty method of making glassware.

Various modes of performing the method and illustrative embodiments of the apparatus now are explained in detail, in conjunction with the drawings, wherein the performance of the method and constructions of the apparatus are depicted.

In said drawings:

Figs. 1 to 6, inclusive, are more or less diagrammatic vertical sectional views of such parts of glass working apparatus as require illustration in order to afford an understanding of the performance of the improved method;

Fig. 7 is a view in vertical sectional elevation of organized apparatus adapted to perform the method and embodying the apparatus illustrated in Figs. 1 to 6 inclusive;

Fig. 8 is a partially diagrammatic view in top plan of the apparatus shown in Fig. 7, parts being broken away for clarity in illustration;

Fig. 9 is a view in horizontal sectional top plan of the apparatus shown in Fig. 7 and taken on line 9—9 of Fig. 7;

Fig. 10 is an enlarged view in top plan of timing mechanism associated with the apparatus shown in Figs. 7 and 8;

Fig. 11 is a view in end elevation partially broken away of the timing mechanism shown in Fig. 10, looking from the right of said Fig. 10;

Figs. 12, 13 and 14 are enlarged views in vertical section of a distributor associated with the machine shown in Figs. 7 and 8, said views being taken respectively on the lines 12—12, 13—13, and 14—14, of Fig. 8;

Fig. 15 is an enlarged view in vertical transverse section of a fragmentary part of the table driving mechanism, said view being taken substantially on the line 15—15 of Fig. 9;

Fig. 16 is an enlarged view of a single device for successively opening the neck rings of the mold units of the apparatus shown in Figs. 7 and 8, showing the device and a neck mold in operative relation.

Figure 25:
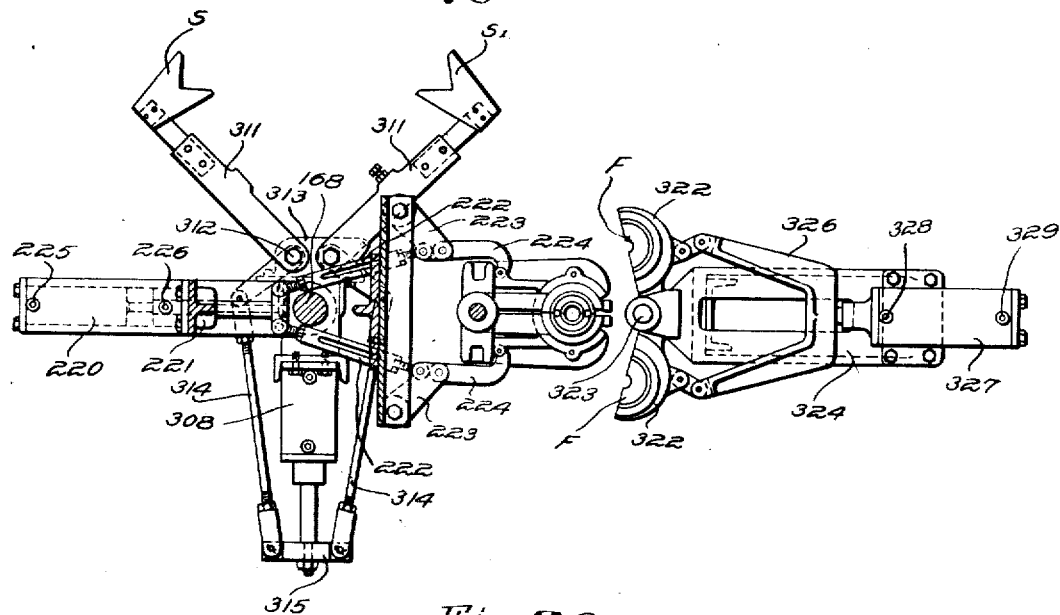
Figure 26:
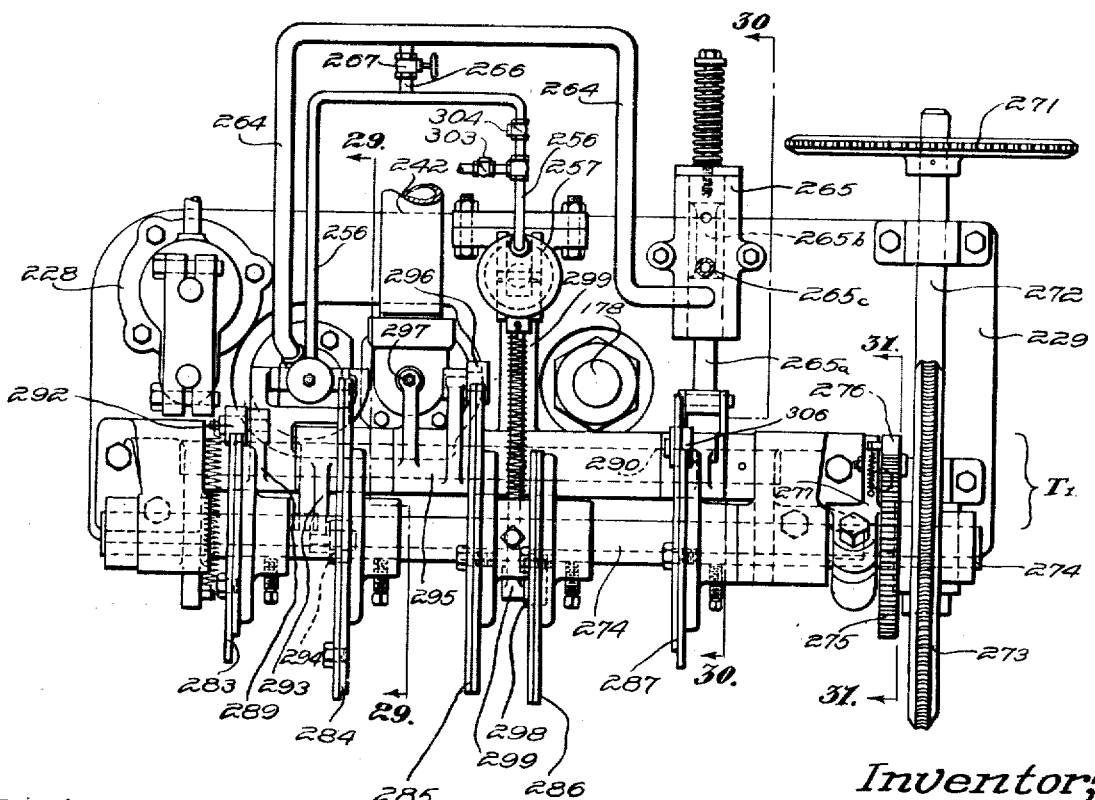

Figs. 17 to 22, inclusive, are more or less diagrammatic vertical sectional views of glass working apparatus embodying both a parison mold unit and a separate finishing mold, and depicting a second mode of carrying out the method of the invention wherein the parison mold is charged by suction from the surface of a gathering pool and a subsequently formed parison is blown to final shape in the finishing mold;

Fig. 23 is a view partly in side elevation and partly in longitudinal vertical section of part of a machine and of a container for a pool of molten glass, by the employment of which the method illustrated in Figs. 17 to 22, inclusive, may be practiced;

Fig. 24 is a partially diagrammatic view in front elevation of the complete machine shown partially in Fig. 23;

Fig. 25 is a view in horizontal sectional top plan of the construction shown in Fig. 24, and taken substantially on the line 25—25 of Fig. 24;

Fig. 26 is an enlarged detail view in top plan of timing mechanism embodied in the apparatus illustrated in Figs. 23 and 24;

Fig. 27 is a still further enlarged view in vertical longitudinal section and elevation of the parison mold unit of the apparatus shown in Figs. 23 and 24;

Fig. 28 is a partially diagrammatic fragmentary view in horizontal sectional top plan, taken substantially on the line 28—28 of Figs. 27 and 29;

Figs. 29, 30 and 31 are transverse sectional views of the timing mechanism shown in Fig. 26, and taken respectively on the lines 29—29, 30—30 and 31—31 of said Fig. 26;

Fig. 32 is a view in end elevation of the parison forming mechanism looking from the right in Fig. 24, and showing a neck mold opening device; and Fig. 33 is an enlarged view in horizontal section of a pawl operating air motor associated with the timing mechanism, said view being taken substantially on the line 33—33 of Fig. 31.

The method and apparatus illustrated in Figs. 1 to 6, inclusive, are described in my copending application above referred to, as follows:

Referring now to the drawings, Figures 1 to 4 inclusive show at 1 a portion of a forehearth or other container for a supply of molten glass 2 of suitable viscosity, temperature and condition to be fed through the discharge outlet 3 of the container under the control of a reciprocating plunger 4 into an underlying mold 5 and to be fabricated in the latter as required for the formation of a bottle or other article of blown glassware. The discharge outlet 3 preferably is located at the lower end of a well 3' in the base of the container 1, and the reciprocating plunger 4 preferably is of substantial area in cross section as compared with the cross section of the well 3' and the diameter of the outlet 3 so that the downward movement of the plunger into the well toward the outlet 3 will cause a strong acceleration of discharge of glass through the outlet 3 while the return or upward movement of the impeller may be utilized to exert a strong retractive impulse on the glass in and below the discharge outlet 3.

Figure 1:
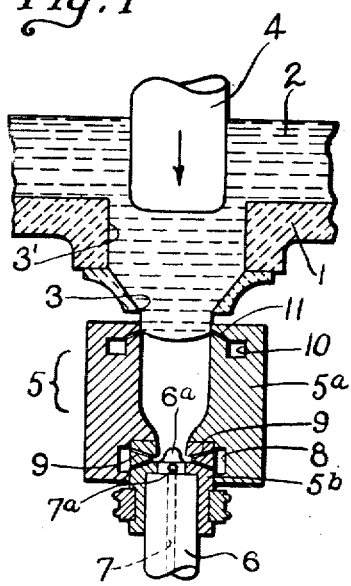
Figure 2:
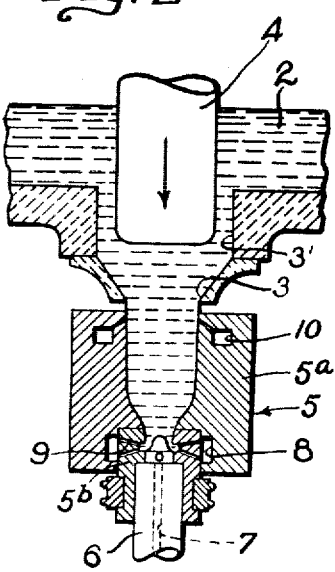
Figure 3:
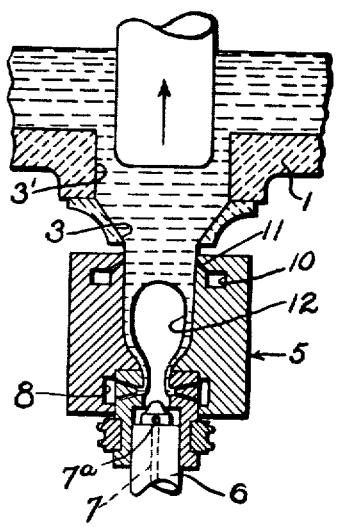
Figure 4:
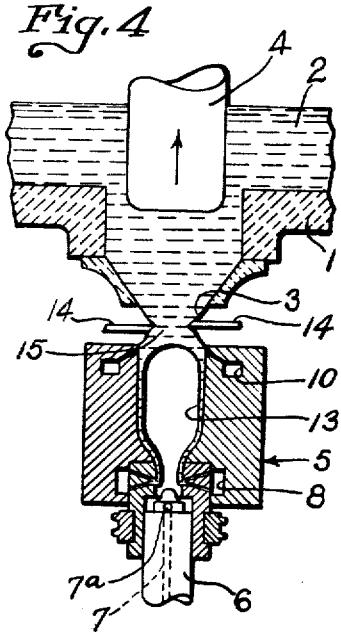
Figure 5:
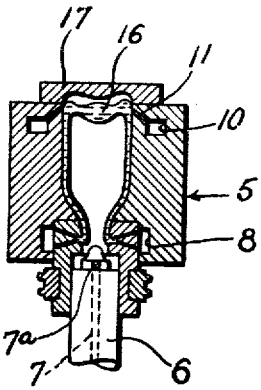

The mold 5 may comprise an annular body 5a and a neck ring 5b and each of these component members of the mold may comprise separable sections, as is well known in the art. A neck plunger 6 is mounted for movement in the bore of the neck ring 5b so that its tip 6a will protrude into the glass receiving portion of the neck ring when the neck plunger 6 is in its raised position, as shown in Figs. 1 and 2, and will cooperate with the adjacent walls of the neck ring to form the neck finish portion of the article being made. The neck plunger 6 may be provided with a central bore 7 adapted for connection with any convenient source of blowing pressure and provided adjacent to the tip 6a with an outlet 7a for discharging the blowing air into the interior of the neck ring and into the cavity of the glass therein when the neck pin is in its lowered or retracted position as shown in Figs. 3 and 4.

The mold 5 is shown as being provided with an annular passage 8 adapted for connection in any suitable known manner with a source of suction and arranged to communicate through the slits or narrow, generally radial, passages 9 with the neck finish portion of the mold; that is, with the interior of the neck ring.

The mold 5 also preferably is formed adjacent to its upper end with an annular suction passage 10 adapted for connection in any suitable known manner with a source of suction and arranged to communicate through the thin passages or slits 11 with the bore of the mold body adjacent to the upper end of the latter. The purpose of the suction passages in the mold will hereinafter be stated.

In the performance of the improved method, the mold 5 in its closed condition and adapted for the reception of molten glass is moved to a position in axial alignment with the discharge outlet 3 with the neck finish portions of the mold located away from the outlet. The upper end of the mold may be disposed in contact with the outlet, but preferably is spaced a short distance therefrom. The plunger 4 begins its downward movement as shown in Fig. 1 and a column of glass of sufficient area in cross section to completely seal the upper end of the cavity of the mold body enters the latter. The discharge of glass through the outlet 3 as the plunger 4 moves downward from the position shown in Fig. 1 to the position shown in Fig. 2 causes a forced relatively rapid filling of the glass receiving cavity of the mold 5, such filling of the latter preferably being accelerated during the latter part of the filling period by suction applied to the glass in the lower part of the mold through the suction passage of the neck ring to aid in the formation of the neck finish of the article being made.

This relatively rapid forced feeding of glass to the mold assures filling of the latter without any posibility of laps or folds in the glass within the mold and also assures a practically instantaneous and uniform first chilling contact of the glass with the walls of the mold cavity.

After the filling of the mold as illustrated in Fig. 2, the neck pin 6 may be lowered and as the glass discharge controlling plunger 4 begins its upward movement to exert a retractive impulse on the glass in and below the outlet 3, air under pressure may be admitted through the neck pin to the interior of the glass within the neck ring, thereby commencing the formation of a bubble 12 in the glass in the mold. The size of the bubble may be regulably controlled by control of the action of the plunger as a glass retracting agent, or by volumetric control of the air admitted through the neck ring to form the bubble, or by combined action of both of these controls. Suction may be applied through the passage 10 and the slits 11 to the periphery of the glass adjacent to the extreme upper end of the body of the mold during the bubble blowing operation and the application of the retractive impulse to the glass by the plunger 4 to prevent such glass from being pulled away from the inner wall of the upper portion of the mold. After a relatively large bubble, which may approximate that indicated at 13 in Fig. 4, has been formed in the manner described, the application of air pressure through the neck ring may be discontinued and the mold with the glass therein may be lowered, as shown in Fig. 4, to attenuate the intervening glass between the mold and the outlet to facilitate the severance of such glass. During this downward movement of the mold and the attenuation of the glass connection between the outlet and the mold, suction on the glass in the extreme upper portion of the mold body may be continued to aid in keeping such glass in intimate contact with the walls of the mold and also to aid in keeping the partially formed parison, having the bubble therein, from sagging downward.

After the attenuation of the connecting glass has been effected, such glass is severed, relatively close to the upper end of the mold, as by closing a pair of shear blades 14 to sever the attenuated glass at 15 as indicated in Fig. 4. The upward movement of the plunger 4 may continue past the position shown in Fig. 4 to retract the stub of glass after the severing operation for the desirable reheating of the severed glass and the elimination of any chill marks which may have been caused by the shearing operation. The severed glass below the severing plane may sag downwardly into the upper end of the mold body substantially as indicated at 16 in Fig. 5 and in the meantime, the mold 5 with the partially expanded and partially formed article therein will be moved out of line with the discharge outlet 3 to permit an unfilled mold to be brought to a glass receiving position at the outlet. The suction on the glass in the upper part of the mold body may be continued during and after the severing operation for the purposes stated until a bottom plate 17 has been disposed in position to close the upper end of the mold cavity and blowing pressure has again been applied through the neck plunger. Such blowing pressure may be used to complete the expansion of the glass in the mold to form the finished article, the glass in the upper part of the mold being forced into intimate contact with the cavity of the bottom plate 17 to form the bottom of the finished article, indicated at 18 in Fig. 6. After the formation of the finished blown article, the mold may be inverted and opened or opened without inversion and the article removed in any suitable known manner for annealing.

It is obvious that the parison formed substantially as shown in Fig. 4 may be transferred, after its severance from the glass supply, to a separate finishing mold and the final blowing of the article to finished form completed in the separate mold, if desired. Also, it is to be understood that the hereinbefore described method may be carried out to form a finished article of blown glassware from glass forced upwardly into a mold disposed thereabove, as by atmospheric pressure, into a suction gathering mold that has been lowered into contact with the surface of a gathering pool of molten glass as is usual in suction gathering operations, without involving any material departure from the essential features of the invention as hereinbefore described. The position, size, and character of operation of the glass discharge regulating plunger 4 may be varied in particulars which are now well known in the glass feeding art to vary the discharge accelerating and retarding or retracting effects of the reciprocation of the plunger. In lieu of a reciprocating plunger, positive and negative air pressures may be applied to the glass in or above the outlet by suitable mechanism, such as now is well known in the art, to produce the desired discharge accelerating and retarding or retractive impulses on the glass in and below the outlet.

The organized apparatus of Figs. 7 to 16, inclusive, adapted automatically to carry out the method and operate the elements of the apparatus to Figs. 1 to 6; the method illustrated in Figs. 17 to 22, inclusive; and apparatus of Figs. 23 to 33, inclusive, adapted to perform the method shown in Figs. 17 to 22, now are described in order.

The apparatus shown in Figs. 7 to 16 inclusive comprises all of the elements shown in Figs. 1 to 6, which elements are identified by the same reference characters as are applied to said Figs. 1 to 6.

Generally considered, the apparatus comprises an automatic multiple mold unit one-table machine, and a feeder like that already described, the operations of which are synchronized by a timer for automatically performing cycles of operations in successive and overlapping time relation.

The machine proper comprises a table which carries four mold units 5 identical with the mold unit 5 already described, together with mechanisms operating the elements of said units. The table is rotated step-by-step and during each period of rest is raised and lowered to correspondingly move a unit 5 in operative relation with the feeder. Aside from the fact that two bottom closure devices may be employed to permit consecutive finish blowing of articles in each mold unit 5, the operations of the apparatus of Figs. 1 to 6, and of Figs. 7 to 16, inclusive, are the same.

Inasmuch as the mold units 5 may be identical in construction, the description of a single one of them will suffice for all. As shown in Fig. 7, mold unit 5 is carried by a bracket 20 secured to the table 21. The bracket 20 carries a vertical pivot pin 22 upon which are mounted holders for the sections of body mold 5a and for the sections of the neck rings 5b. The bracket 20 also is provided at its bottom with a laterally projecting support or arm 23 which is bored to receive and guide the plunger 6, the tip or neck pin 6a of which is adapted to form an initial blowing cavity in a charge of glass. The complete mechanisms for operating the body molds and neck rings, as well as that for operating the plungers 6 are later described.

The table 21 is mounted for rotation and reciprocation on column 25 rigidly fixed in a vertical sleeve 25a formed integrally with the base 26 of the machine. The weight of the table and the parts carried thereby is borne by a collar 27 surrounding the column, supported by vertical links 28, Figs. 7 and 9, pivoted at their bottom ends to the side members of a yoke or double lever 29. The yoke 29, which straddles column 25, is pivoted at its inner end, as indicated at 30, on a vertical bracket 31 arising from the base 26, and formed integrally therewith and with the sleeve 25a.

Interposed between the side members of the yoke 29 near the outer end of the latter is a roller 32, positioned for engagement by the rod 33 of piston 34 in cylinder 35. Air pressure is supplied to the bottom end of the cylinder 35 to raise the table 21, and exhausted from said cylinder to lower the table, through a conduit 36, leading from a timer T, as indicated in Fig. 10. The construction of the timer is described hereinafter.

At its extreme outer end, yoke 29 carries a cross member 37 through which projects a vertical bolt 38 mounted in the base 26. The bolt 38 has spaced nuts 39 and 40 screw-threaded thereon with which the cross piece 37 engages when it is in its uppermost and lowermost positions respectively. Thus, the nuts 39 and 40 limit the upward and downward movements of the table 21 and may be adjusted to vary such movements, according to requirements met with in practice, in supplying glass from the feeder orifice 3 to the mold units 5, and in shaping and severing the glass as it is supplied to said units.

The mechanism for rotating the table includes a gear 42, Figs. 7 and 8, formed on the periphery of the table and with which meshes a spur gear 43, Figs. 7 and 9. Spur gear 43 is fastened to the upper end of shaft 44 journaled at its upper end in the outer end of bracket 31, previously referred to, and at its lower end in a suitable bearing 45 formed in the base 26.

The shaft 44 is held against vertical movement, and is rotated at the desired times in the required direction by air motor 47, Figs. 8 and 9, to and from the opposite ends of which air pressure is admitted and exhausted through conduits 48 and 49, which as indicated in Fig. 10, are connected to the timer T.

As shown in Figs. 8 and 9, air motor 47 is suitably secured to the base 26, and the rearwardly extending piston rod thereof is provided with a rack 51 which periodically drives a pinion 52, Figs. 7 and 15, slidably mounted on shaft 44 but held against rotation thereon by a key 53, thereby rotating the table 21, step-by-step. Pinion 52 is raised and lowered out of and into engagement with rack 51 at appropriate times by mechanism, shown in Fig. 15, and comprising a piston 55 in cylinder 56 the rod of said piston carrying a forked member 57 which embraces a collar 58 formed on or secured to the bottom of pinion 52. Air is admitted to, and exhausted from the bottom end of cylinder 56 to raise the pinion 52 and permit it to fall, through a conduit 59 connected to the timer T, as indicated in Fig. 10. When table 21 is in readiness for a step of rotation, pinion 52 is in mesh with the rack and after air motor 47 operates to rotate the table, the pinion is raised to permit the rack freely to be retracted preparatory to another table-rotating operation.

The body mold 5a of each of the mold units may be opened and closed in response to the rotation of table 21 which carries them, and to this end, the holders for the sections of each of said molds may be operatively connected to a slide 61, Figs. 7 and 8, mounted on rods 62 fixed in the bracket 20, as shown. The holders are connected to slide 61 by links 63. Each slide 61 may carry a cam roller 64 adapted successively to engage first the inside of a cam 65 for opening the body mold then the outside of a cam 66 for closing the body mold and holding it closed, both of said cams being in the form of flanges depending from cam plate 67 (Fig. 7). Cam plate 67 is made in halves held together by bolts by means of which it is held around column 25 in sliding engagement therewith. A dovetail swivel joint 68, serves to connect the cam plate with table 21 for vertical movement therewith on the column, but the cam plate is held against rotation by a key indicated at 69.

Referring to Figs. 7 and 8, it will be seen that successive steps of rotation of the mold table in a clockwise direction, through an angle of 90° in each step, carries the units 5 into and out of the feeding station designated at A, a first blowing station indicated at B, a second blowing station indicated at C and a takeout station D. Each mold 5a is opened by cam 65 as it moves from C to D, and closed by cam 66 as it moves from D to A, and held closed between A and C by cam 66.

As shown in Fig. 7, the plunger 6 of unit 5 at station A is provided on its bottom end with a head 70 and between the head 70 and arm 23 is interposed a compression spring 71 which normally holds the plunger and neck pin 6a in retracted position. The head 70 also is bored to provide communication between an air pressure pipe or conduit 7b connected thereto, with the central bore 7 in the plunger, at a time and by means hereinafter explained. All of the plungers 6 and neck pins 6a are constructed and operated in the same way.

Located at station A is a device which successively operates the plungers to seat their tips 6a. Said device comprises an air motor 72, Fig. 7, the rod 73 of which is screw threaded for the reception of the bolt 74 adjustable in the rod, held in position for successive alignment of the heads 70 of the plunger 6 therewith, so that upward movement of the air motor seats a plunger tip or neck pin 6a. The rod 73 also carries a cross bar 75 to the ends of which tension springs 76 are connected. Air pressure is admitted to and exhausted from the bottom of air motor 72 through conduit 77 connected to the timer T, Fig. 10, when a unit 5 is in raised position at station A. As a result, the bolt 74 engages a head 70 and seats and holds a neck pin 6a seated for the desired time after which bolt 74 is lowered by springs 76 and spring 71 unseats the neck pin.

At stations B and C are located respectively bottom closure devices 17 and 17a and mold locking devices 80 and 81 respectively, for engaging the body molds so that articles of glassware may be blown at both of those stations, if desired. The bottom closure and mold locking devices located at the respective stations and the operating mechanisms therefor may be identical, hence only one of each need be described, those at the station C being selected.

As shown in Fig. 7, the bottom closure mechanism 17a and mold lock mechanism 81 both are carried by a vertical post 82 clamped in bracket 83 secured to the base 26. The post 82 in turn carries a horizontal bracket 84 intermediate its ends for supporting the mold lock mechanism 81, and to its upper end an air motor 85 is clamped. The piston rod of air motor 85 supports the bottom closure 17b. Air pressure is admitted to and exhausted from the opposite ends of air motor 85 to raise and lower the bottom closure 17b, through the conduits 86 and 87 which lead from timer T. Branches (not shown) of conduits 86 and 87 may serve the bottom plate mechanism 17 at station B so that the bottom closures at stations B and C are simultaneously operated from the timer through the same air supply conduits.

The mold locks 80 and 81, of which the latter is described in detail, may be of known construction. As shown in Fig. 8, the mold lock mechanism 81 comprises clamping jaws 89 which may be pivoted on post 82, Fig. 7, said jaws being arranged to close around lugs 90 projecting from the holders for the sections of the body molds 5a of each of the mold units 5. The jaws 89 are opened and closed by means of an air motor 91 the rod of which is connected to the jaws by links 92. Conduits 93 and 94 serve to admit and exhaust air pressure to and from the opposite ends of the air motor 91 to release the jaws from lugs 90 of a mold at about the time the table is to be given a step of rotation and to close the jaws about lugs 90 of a succeeding mold after the table comes to rest. The mold clamping mechanism 80 may be pneumatically operated in the same manner as mechanism 81 and pressure delivered to and exhausted from through branches (not shown) of conduits 93 and 94. Thus the mold clamping devices may be opened and closed simultaneously.

The sectional neck molds 5b of the mold units 5 may be held closed by means of springs not shown which springs permit the neck molds successively to be opened upon the arrival of the mold units at station D where finished articles are removed.

Located at the station D as shown in Figs. 8, 9 and 16, is an air motor 96, the rod 97 of which terminates in a wedge 98. The rod 97 also carries a cross piece 99 to the ends of which are connected tension springs 100 which serve to retract the wedge when air pressure is exhausted from air motor 96 through air inlet and outlet conduit 101 provided in the bottom of the air motor. It will be understood that the conduit 101 is connected to the timer T, as indicated in Fig. 10. When a mold unit 5 moves to station B, and the body mold 5a opened by cam 65, admission of air pressure to air motor 96 forces the wedge 98 upwardly through an opening in arm 23 and into opposed recesses one of which is shown at 98a, Fig. 16, formed in the holders for the neck ring sections 5B. The holders thus are spread apart to release an article of glassware. Air pressure is exhausted from air motor 96 after the removal of the article of glassware to permit the neck ring to be closed by means of its closing spring (not shown).

The means for supplying air pressure and vacuum to the various mold units 5 now is explained.

As previously stated, blowing pressure is conducted to the bores 7 in the plungers 6 through flexible conduits 7b. In like manner, vacuum is conducted to the annular chambers 8 of body molds 5a (for applying vacuum to the neck molds) through flexible conduits 8a, and to the upper vacuum chambers 10 through flexible conduits 10a. The various conduits referred to are shown in Fig. 8.

The conduits 7b, 8a, and 10a, are connected to a cluster of pipes 7c, 8b, and 10b, there being four groups of such pipes, one group for each mold unit, all of the pipes for all the units being mounted in angularly spaced relation to each other in a cylindrical collar 103. As shown in Figs. 7, 8, and 12 to 14, inclusive, the collar 103 is rotatably mounted on a sleeve-like plug 104 secured to the top of column 25 in axial alignment therewith.

Member 103 and stationary member or sleeve-like plug 104 which it surrounds, constitute a multiway rotary valve or distributor, member 103 being held for rotation in vertically fixed position by flange 104a on said plug. Member 103 is rotated relative to plug 104 by means of a four-armed spider, the ends of which are bolted to brackets 20 on the table 21, and the hub of which is slotted to receive bosses on member 103, as shown in Fig. 8. The spider is free to rise and fall with the table without moving the member 103, but rotation of the mold table causes corresponding rotation of member 103, as a result of which air and vacuum are distributed as follows:

When a mold unit is at station A (Figs. 7 and 8) and the supply of glass thereto is about to start, or has started, vacuum is applied to chamber 8 in body mold 5a through conduit 8a and pipe 8b, the latter of which is in registry (Figs. 8 and 13) with a horizontal port 106 in stationary plug 104. Port 106 leads upwardly through duct 107 to conduit 108 connected to timer T, Fig. 10, which supplies vacuum to chamber 8 at the desired time. That assists in drawing the glass into the mold unit and in shaping the neck finish. In like manner, vacuum is applied to chamber 10 in body mold 5a, (Figs. 7, 8 and 14) through conduit 10a, pipe 10b, horizontal port 109 and vertical duct 110 both in plug 104, and conduit 111 leading thereto from timer T, which also controls such application of vacuum at station A. Therefore, vacuum is applied to the upper part of the glass to hold it against the mold wall. At the appropriate time, the desired volume of air is introduced through bore 7 in plunger 6 by way of conduit 7b, pipe 7c, (Figs. 7, 8, and 12), horizontal port 112 and vertical duct 113 in plug 104, and conduit 114 which leads from a volumetric air supply device 115 (Figs. 10 and 11) operated by timer T as later explained. That assists in emptying glass from the mold and may occur while vacuum is being applied to the chambers 8 and 10.

When the mold unit moves to station B, suction pipe 10b, after a very short travel comes into registry with a groove 116, Figs. 8 and 12 to 14, which groove is formed on the periphery of plug 104, and is of such length that pipe 10b does not move out of registry therewith until the mold unit has moved toward and away from station C. Suction is continuously applied to groove 116 through a conduit 117 (Figs. 8 and 14) which leads from a suitable source (not shown). Thus, vacuum may be applied to the upper end of body mold 5a practically continuously from the time the glass is supplied thereto until the mold moves away from station C, to hold the glass against the mold wall during that time. At stations B and C, pipe 8b and hence chamber 8 of mold 5a, is not in communication with any source of vacuum.

When the mold unit moves successively to stations B and C where bottom closure devices 17 and 17a are located, these closures are seated into the mold and blowing air is successively admitted to pipe 7c which communicates with plunger bore 7, for the purpose of blowing out the bottom of the glass to shape. As shown in Figs. 8 and 12, pipe 7c at station B registers with horizontal port 118 which through vertical duct 119, communicates with pressure conduit 120 of timer T (Figs. 12 and 10). At station C, pipe 7c receives air pressure from horizontal port 122 (Figs. 7 and 12) vertical duct 123, and conduit 124 which leads from timer T.

Shear blades 14 may be operated in suitable known manner, as for example by means of pneumatically actuated mechanism of well known type and which as shown in Figs. 7 and 8, includes an air motor 126 provided with conduits 127 and 128 which lead from timer T (Fig. 10).

Considering now the construction of timer T, which is in general similar to that shown in United States Patent No. 1,843,159 to Henry W. Ingle of February 2, 1932 assigned to the Hartford-Empire Company, and referring to Figs. 10 and 11, it will be seen that the timer comprises a slotted drum 130. Buttons 131 are adjustably mounted in the slots on the drum, said buttons serving to open suitable valves (not shown) which control passage of vacuum and air to (and from) the various conduits connected to the timer.

Drum 130 is mounted on horizontal shaft 132 journaled in suitable bearings, and carrying a sprocket wheel 133, engaged by chain 134, driven from pinion 135 of variable speed mechanism 136, in turn driven by motor 137.

Shaft 132 also has fast thereon a large gear 138 in mesh with pinion 139 on countershaft 140. Countershaft 140 also carries a sprocket wheel 141 which drives a chain 142 (Fig. 9) passing around pinion 143, on shaft 144 of reduction gearing shown diagrammatically at 145 (Figs. 8 and 9) of known construction and arrangement, and which serves to operate plunger 4 of the feeder. In that manner the operations of plunger 4 of the feeder and the machine proper both are timed from timer T, and such operations properly synchronized.

Timer T also serves to operate the volumetric air control device 115, previously referred to. Said device comprises a cylinder 147 (Figs. 10 and 11) containing a piston 148 on slide 149 between guides 150. The rod of piston 148 is connected to the lower arm of bell crank 151 by a pin 152 on the rod projecting through slots in the arm of the bell crank, one of which slots is shown at 153. The upper arm of bell crank 151 carries a roller 154 adapted to be engaged periodically by a cam 155 adjustably mounted on drum 130. Cam 155 thus rocks the bell crank to depress piston 148 in cylinder 147, forcing a predetermined volume of air from the latter into conduit 114 and thence to a mold unit 5 at station A, to blow the desired size of bubble in the glass in said unit. The volume of air thus expelled may be varied at will by sliding cylinder 148 between guides 150, toward or away from the drum 130, that varying the effective length of the lower arm of bell crank 151, and the stroke of piston 148. As shown in Fig. 11, roller 154 yieldingly is held in position for engagement by cam 155, by a tension spring 156 connected to an arm joined to the bell crank 151.

One mode of operating the above-described organized apparatus in performing the novel Fill and Empty method of my invention, will be apparent from the previously quoted description from my copending application and may be as follows:

As table 21 comes to rest in its lower position, a mold unit 5 arrives at station A in alignment with and beneath the discharge outlet 3 of forehearth 1, for the reception of glass. That also places the plunger mechanism in alignment with the pneumatic neck-pin seating means. The vacuum and air distributor is moved into the position shown in Fig. 8 for the supply of vacuum and air to the mold unit. The pinion 52 is disengaged from rack 51 so that the latter may be retracted preparatory to rotating the table another step.

Air pressure now may be admitted to cylinder 35 to raise the table and to position mold unit 5 at station A as close as desired to discharge opening 3 of the feeder, or in the position in which one of said units is shown in Figs. 1 to 3 and 7. The neck pin is seated at this time by admission of air to motor 72. The glass then is supplied to the mold unit preferably with the assistance of vacuum applied to chambers 8 and 10 through the connections previously described.

When the desired neck pin contact time has elapsed after the filling of the neck ring with glass, the neck pin and plunger are retracted by exhaust of air from motor 72, through the timer T. Preferably, though not necessarily, the neck finish of the glass is permitted to set, and the initial blowing cavity formed and possibly chilled by the plunger tip 6a, is permitted to reheat at this time for the desired period. A predetermined volume of air then may be admitted through plunger 6, from the device 115 and through connections already mentioned leading to and through conduit 7b into the mold unit. The admission of such air may be timed to occur with the retraction of feeder plunger 4, by timer T which controls both the time of ascent of the plunger 4 and the admission of the air, to expel hot interior glass from the mold unit and form a bubble in the glass as shown at 13 in Fig. 4. The desired size of bubble is formed in the glass provided that the volume of air is properly selected and/or the retractive force of the plunger 4 properly regulated in accordance with the temperature and resistance of the glass.

Figure 6:
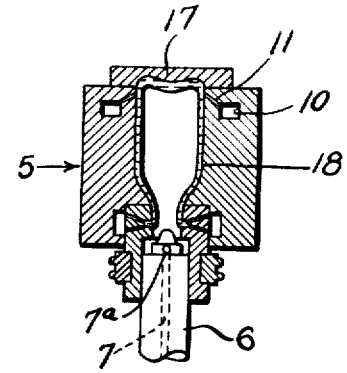

The table 21 now may be lowered by the exhaust of air from cylinder 35 to attenuate the glass above that in the mold unit which glass then is severed by shears 13 operated by air motor 126 from timer T. In the meantime, pinion 52 will have been re-engaged with rack 51 which now is operated by air motor 47 to move the charged unit 5 to station B. During such movement, a new vacuum connection with chamber 10 is established as well as a new connection for pressure conduit 7b. Upon completion of the rotary movement, the table again is elevated for charging the second unit 5 at station A, as before, and for blowing the glass in unit 5 at station B. At the latter station the closure of bottom plate mechanism 17 engages the open end of body mold 5a (Fig. 5) and blowing air is admitted to the unit through conduit 120 from timer T by way of conduit 7b, as previously explained, to blow the glass (as shown in Fig. 6). The last-mentioned operations may be repeated at station C, if desired, to further set the glass of the hollow article in the first unit, as shown in Fig. 7. At station C, the body mold 5a is closed by bottom plate 17b operated by air 85, and air is admitted through the plunger as before but through conduit 124 leading from timer T, instead of conduit 120.

It will be understood that the body mold 5a is held closed at stations B and C by mold lock devices 80 and 81, and that the blowing operations at those stations take place while the table 21 is at rest in its uppermost position.

As the table 21 (after having been lowered) is given another step of rotation, the first mold unit 5 will be moved to station D. During such movement, body mold 5a is opened by cam 65, (having been held closed between stations D and C by cam 66) leaving a completed hollow body, (which may be either a parison or a finished article), supported by the neck ring 5b. The latter is opened at station D by admission of air to motor 96, as previously explained, and the hollow body removed in suitable manner. If the hollow body is a parison, it may be transferred to and blown in a separate finishing mold in known manner.

The body mold 5a of the first unit is closed by cam 66 as the unit is again moved to station A to begin another cycle of operations, it being understood that the other three units 5 go through the same cycles of operations in overlapping time relations.

The construction and mode of operation of the apparatus above described may be widely varied without departing from the principle of the invention.

The mold units of the machine, which may be used for forming either finished articles or parisons to be blown in separate finishing molds (not shown) may be mounted for inversion and reversion in known manner. Separate finishing molds, if used, may be mounted on the same table as the parison mold units or on a different table. Or a forming machine may be employed of the type in which the molds are chain-driven, and/or are more or less stationary and arranged in straight lines, etc.

The description now is proceeded with of the second mode of carrying out the novel Fill and Empty method of my invention as illustrated in Figs. 17 to 22, wherein charges of glass parisons are gathered from the surface of a gathering pool by suction, and the parisons formed from those charges blown to final shape in a mold separate from the parison mold; this description also being directed to the apparatus of Figs. 23 to 33, inclusive for so carrying out the method.

As illustrated in Figs. 17, 18 and 19, a parison mold unit of suitable construction may be provided for gathering glass by suction from the surface of a pool. As shown, said unit comprises a suction and blow head H, a neck ring or mold N, and a body mold M. A neck pin P projects through head H into the neck mold N and may be bored and provided with a valve V, as shown, for the controlled supply of air pressure through the neck pin. The suction head H, the neck mold N, and the body mold M, are provided with suitable vacuum passageways. The head H preferably is provided with separate air pressure and vacuum passageways.

The cavity of the body mold M may be flared inwardly as indicated at U, for a purpose hereinafter explained.

Fig. 17 shows the parison mold unit just after it has been moved into a position above a gathering pool G and both the body mold M and the neck mold N filled with a charge c of glass by the application of suction along paths shown by the arrows in the vacuum passageways. It will be understood that at the time that the mold unit is charged, the neck pin P will be projected into the neck mold, as shown in Fig. 17.

After the mold unit has so been charged it is raised out of contact with the pool G into a position such as is illustrated in Fig. 18. When the exterior of the glass in the mold unit has become sufficiently set by the chilling action of the mold surfaces thereon, and the interior of the neck of the charge sufficiently chilled by the neck pin P, hot interior glass may be expelled from the chilled exterior glass, as for example, by opening the valve V for the admission of air pressure which expels the hot interior glass, forming a bubble as indicated at O, and leaving a hollow body in the mold, the wall of which is indicated at $w$.

At this time, the glass connecting the glass in the pool with that in the mold may be attenuated as indicated at $a$, between which and the bottom of the bubble O is glass as indicated at $b$, which subsequently may form the completed bottom of the hollow body. The attenuated glass now may be severed as by means of overlapping shear blades S and S1 which, if desired, may be of the V-notched type. That leaves the hollow body in the mold composed of the wall $w$ with the bottom $b_1$ as illustrated in Fig. 19.

Instead of blades S and S1, a single shear blade (not shown), V-notched or otherwise, may be employed for severing the glass in known manner.

Ordinarily it is preferred to withdraw the neck pin P before expelling air is applied to the charge $c$ to force out the hot interior glass, and a sufficient period of time permitted to elapse to chill the neck finish and to reheat the lining of the initial blowing cavity formed by the neck pin, so that the expelling air will have a uniform action on the interior glass. The expelling air then may be admitted either through the neck pin P, as before, or a solid neck pin employed, and air admitted around it as shown in Figs. 3 and 4.

Whether or not the neck pin is withdrawn before the glass expelling air is admitted depends upon the type of ware being made, and other conditions of practice.

It will be understood that during the operation depicted in Figs. 18 and 19, the application of vacuum to the exterior of the glass in the mold unit may be maintained as shown by the small arrows leading from the outer surface of the glass. That insures that the external shape of the exterior glass, initially imparted thereto in the filling operation, will be preserved, or substantially preserved.

It also will be understood that if the proper predetermined volume of air is applied to the glass in the operation shown in Fig. 18, in accordance with the temperature and resistance of the glass, the cavity or bubble O will be of the proper size and length and will leave the proper or desired amount of glass at $b$ to form the bottom of the hollow body. It follows, that the wall $w$ of the hollow body will be of the desired thickness and the glass distributed therein uniformly.

After the tail of glass has been severed from the hollow body in the mold, the hollow body or parison may be finished on its bottom, or the bottom further shaped, by applying a bottom closure K to the bottom of the body mold M and admitting air around the withdrawn neck pin P, all as illustrated in Fig. 20. Such operations may shape the bottom of the hollow body into the form indicated at $b_2$. However, the operations for shaping the bottom as just described are not necessary and may be omitted.

The hollow body either in the condition shown in Fig. 19, or as shown in Fig. 20, now is introduced into a finishing mold F, the bottom of which may be closed by a bottom closure $K_1$. Air under suitable pressure now may be admitted around the neck pin P which has remained in retracted position, to blow the hollow body or parison to final shape, forming an article A of glassware.

If preferred, a separate blow head (not shown) adapted to cooperate with finishing mold F may be provided, and the parison released from the neck mold before it is finish blown, in known manner.

The use of a body mold having an inwardly flared cavity is preferred though not essential. It has the advantage, however, of causing the lower part $w_1$ (Figs. 18, 19 and 20) of wall $w$ of the parison to be of uniformly increasing thickness from say near the shoulder to the bottom of the parison, because of the restrictive effect of the mouth of the mold upon the expulsion of the hot interior glass.

Moreover, during the interim between the severing and finish blowing operations, shown respectively in Figs. 19 and 22, the uniform downwardly increasing thickness may become even greater as the result of downward flow of the more or less plastic glass. For example, the glass at or near the shoulder $w_2$ (Fig. 21) may become thinner, and the wall $w_3$ below the shoulder may become increasingly thicker than the same wall portion $w_1$ in Figs. 18, 19 and 20. The bottom of the parison also may become thicker, as shown at $b_3$ (Fig. 21), than the previous bottom $b_1$ (Fig. 19) or $b_2$ (Fig. 20).

Such variation in wall thickness is highly advantageous in effecting uniform distribution of the glass in the finish blowing operation.

A suitable automatic machine, embodying the apparatus and which may be used for performing the method, illustrated in Figs. 17 to 22 inclusive, now is described with particular reference to Figs. 23 to 33, inclusive, the same reference characters as used in Figs. 17 to 22 for identifying various parts of the apparatus also being applied to Figs. 23 to 33.

The pool of glass G (Fig. 23) is contained in a forehearth or extension 160 of a glass tank, not shown, but the front wall of which is indicated at 161. The fore hearth may comprise a lining 162 of highly refractory material surrounded by insulation 163. In order to circulate the glass, an island 164 of highly refractory material may be positioned in the forehearth to provide a U-shaped channel or passageway (not completely shown), the bend of which provides the pool G, and in one leg of which may be mounted an impelling implement 165. Such an arrangement for circulating glass is disclosed in the United States patent to Karl E. Peiler, No. 1,721,487, granted July 16, 1929, which also shows mechanism for moving the impeller in a vertical rectangular path as indicated by the arrows at 166, or otherwise, while the implement constantly is maintained in contact with the glass. The implement may be moved at a greater speed in one horizontal direction than in the other, to cause a circulation of the glass through the pool G at the required velocity and in the required manner to remove from the pool chilled bits of glass and chilled spots, produced by the gathering and severing operations. The glass in the forehearth may be partially enclosed by means of the cover construction 167 through which the stirring implement 165 projects. That permits heat to be applied to the rear portion of the forehearth to recondition glass therein, as may be desirable or necessary.

The parison mold unit which comprises the suction and blow head H, neck mold N, body mold M, and neck pin P, Figs. 23 and 27, may be carried by a column 169, Figs. 23, 24 and 25, journaled intermediate its ends in a block 170, Fig. 23, secured to and extending rearwardly from the top of a channel iron 171, the bottom of which is secured to a bearing 172, mounted on base 173, and through which bearing and base the bottom portion of the column 169 extends.

Secured to the top of column 169 is a bracket 174. The horizontal portion 175 of the bracket carries a pair of rods, one of which is shown at 176, to the ends of which rods a casting 177, Figs. 23, 24 and 27, is secured. As shown in Fig. 27, the suction and blow head H is formed integrally with the casting 177, and said casting is bored to receive a pivot bolt 178 upon which the holders 179 for the sections of neck mold N, and the holders 180 for the sections of the body mold M, are swingably mounted. See also Figs. 23 and 24. The details of the head H and the mechanism for operating the neck mold N and the body mold M are later explained.

The column 169 is so mounted that it may be lowered and raised to move the body mold M into and out of contact with the surface of pool G, and when in its raised position, to be swung through an angle of approximately 90° in a clockwise direction into a position where, as shown in Figs. 24 and 25, the finishing mold F is located. In that position, a parison is blown to final shape in the finishing mold F, after which the column is rotated in the opposite direction again to position the parison forming unit above the pool G.

The mechanism for raising and lowering the column and parts carried thereby and for swinging the column now is described.

Secured to the column 169 is a collar bearing 182, Fig. 23 with which cooperates a collar 183, suitable anti-friction bearings being interposed between the two collars. Collar 183 which carries the weight of column 169 and parts mounted thereon, is supported upon links, one of which is shown at 184, connected at their bottom ends to the end of a lever 185 pivoted intermediate its ends at 186 on the base 173. A series of openings 187 may be formed in the inner end of lever 185 for changing the connections of links 184 therewith and thereby varying the stroke of column 169.

As shown in Figs. 23 and 24, the outer end of lever 185 carries a roller 188 which bears against the cam disc 189 adjustably secured to a hub 190 fast on a horizontal shaft 191.

Looking at Fig. 24, it will be seen that shaft 191 is journaled at its right-hand end in a vertical bracket 193 and that said shaft extends to the left through the spaced vertical pedestals 194 and 195 of a U-shaped bracket 196 on base 173. On its right-hand end, looking at Fig. 24, shaft 191 carries a gear 197 in mesh with a pinion 198 of suitable speed reduction mechanism 199 which may be driven by a motor 200. The driving connections thus provided for shaft 191 may serve to rotate it and cam 189 in a counterclockwise direction looking at Fig. 23.

Mounted on shaft 191 between the vertical arms of bracket 196 is a drum 202 of a timer designated generally at T. Drum 202 may carry buttons adjustably secured to the periphery thereof for operating valves not shown, in a valve chest 203 for controlling the distribution of air pressure to various parts of the machine, in response to the rotation of shaft 191.

This timer also may be of substantially the same construction as that shown in the United States Patent No. 1,843,159 assigned to the Hartford-Empire Co. and referred to above.

Returning to the description of the mechanism for operating the column 169, and referring particularly to Fig. 23 it will be seen that cam 189 acts on lever 185 to raise and lower column 169 and the parison mold unit carried thereby. In the position in which the parts are shown in Fig. 23, the parison mold unit is in its uppermost position above the gathering pool being so held by the terminal end portion of the high part 205 of cam 189. As cam 189 continues to rotate in a counterclockwise direction, roller 188 rises in a recess 206 of the cam as a result of which the mold unit is lowered to dip the bottom of the parison body mold M in the pool G where it is held for the desired time by a concentric dwell portion 207 of the cam. While so held in lowermost position, the parison mold unit is charged with glass after which the roller 188 is lowered by the projecting cam portion 208, then rides onto a concentric dwell portion 209 which holds the mold unit in a position for the glass depending from the charge in the mold to be severed by the shears S—S1. Upon completion of the severing operation, roller 188 is engaged by the advanced end portion of high part 205 of cam 189 to raise the glass in the mold from off the shears and to position the mold unit in its uppermost position in readiness to be swung to the finish blowing station. This raising of the mold unit prevents smearing of the bottom of the charge by the shear mechanism.

For rotating the column 169 and the parison mold unit, a crank arm 211, Figs. 23 and 24 is secured to the bottom end of the column, to which crank arm the inner end of a link 212 is joined by a ball and socket connection 213. At its outer end, link 212 is connected by a ball and socket connection to the bottom end of a lever 214 pivoted at its upper end in the tops of the bracket 193 and the pedestal 194 by means of a rock shaft 215 to which the lever is secured. Lever 214 carries a roller 216 which is held in position for engagement by a cam disc 217 adjustably secured to a hub 218 fast on shaft 191.

Thus cam 217 oscillates the parison mold unit horizontally from the gathering position to the finish blowing station and returns the parison mold unit to the gathering station, at appropriate or desired times.

The adjustable mountings of cams 189 and 217 permits the times of raising and lowering and swinging of the parison mold unit to be varied to suit varying glass working requirements.

The parison body mold is operated by means of an air motor 220, Figs. 23, 24 and 25 secured to the vertical portion 221 of bracket 174. The rod of air motor 220 is connected to links 222 which in turn are joined to levers 223 pivoted on the horizontal portion 175 of bracket 174, and in turn connected by links 224 to the holders 180 of the parison body mold M. Air is admitted to and exhausted from the opposite ends of air motor 220 through conduits 225 and 226 which lead from the timer T, to open and close the mold at the appropriate times. Thus, the parison body mold is opened at the finish blowing station and is closed at least by the time that the parison mold unit is returned to the gathering position.

The neck mold N carried by the holders 179 normally yieldingly is held closed by a spring 179a, Fig. 27. However, the neck mold or neck ring is opened at the finish blowing station to release a shaped article of glassware therefrom by the operation of an air motor 228, Figs. 24, 26 and 32. Air motor 228 is mounted on the outer end portion of a base 229 supporting timing mechanism T1 and parts operated thereby, said base resting upon and being secured to the horizontal portion 175 of bracket 174 and to the casting 177.

Referring to Fig. 32, it will be seen that the rod 230 of air motor 228 carries a cross head 231 to which is connected a vertical rod 232 extending downwardly through base 229 and carrying a wedge 233 adapted to enter between lugs 234 on the neck mold holders 179. Rod 232 and wedge 233 normally are held in inoperative position by a compression spring 235 and are moved downwardly to open the neck ring by the admission of air pressure to the upper end of motor 228 through a conduit 236 which, as shown in Fig. 24, leads from the timer T.

Details of construction of the parison forming unit including the suction and blow head H, mechanism for operating the neck pin P, and valve V therein, and passageways and valve mechanism for the introduction of air or vacuum into the molds of the unit, now are described.

The general construction of the parison mold unit best is shown in Fig. 27. The head H has an outer vacuum chamber 238, and an inner vacuum and pressure chamber 239 separated from chamber 238 by a sleeve 240 mounted in the head, as shown.

Also mounted in the head H is a valve casing 241, having a vacuum inlet pipe 242, Figs. 26 and 28, and containing a poppet valve 243 which controls the admission of vacuum to chamber 238.

Leading downwardly from the chamber 238 are vertical ducts 244 which open into an annular chamber 245 with which chamber ducts 246 in the sections of the neck ring N register when the neck ring is closed. Suitable passages lead off of the ducts 246 to the top of the neck finish portion of the neck mold for applying vacuum thereto, and the bottoms of said ducts are placed in communication with similar vertical ducts 247 in the sections of the body mold M from which ducts vacuum is applied to the mold cavity through the joint of the mold when the mold is closed.

The bottom end of sleeve 240 which provides the chamber 239, previously referred to, bears against the top of a nipple 248, supported in the head H, and providing an opening 249 into and out of which the neck pin P is projected and withdrawn to more or less restrict, or to unobstruct the said opening.

Vacuum is applied to the chamber 239 and hence to the interior of the neck and body molds to assist in charging the molds with glass, through a vacuum inlet casing 251, Figs. 28 and 29, under the control of the poppet valve member 252.

The neck pin P, is screw-threaded into the bottom end of a plunger 254 slidably mounted in the sleeve 240 for vertical reciprocation in the chamber 239. The plunger 254 is tubular, being opened and closed at its bottom end by the valve V, the rod 255 of which extends upwardly through the plunger and terminates above the top thereof. Near its top, plunger 254 has an air supply conduit 256 connected thereto, Figs. 26, 27 and 29, which as shown in Figs. 26 and 30, leads from a volumetric air supply device 257, suitably mounted on base 229, and which supplies a predetermined volume of glass expelling or emptying air through the plunger and neck pin when valve V is opened.

Plunger 254 is closed at its upper end by a cap 258, Figs. 27 and 29, connected for lost motion to the top of the plunger by pins 259, the inner ends of which engage slots 260, formed in the plunger. The cap and plunger yieldingly are urged apart by a compression spring 261. Mechanism later described is connected to cap 258 to reciprocate the plunger 254 and operate valve V.

Valve V yieldingly is held seated by a compression spring 262 inside of spring 261 and surrounding the top portion of stem 255 as shown. It is opened by a screw 263 in cap 258 which screw engages the top of stem 255 when the cap is moved downwardly relative to plunger 254, after previously having been depressed to place neck pin P in operative position by joint downward movement of cap and plunger. Such opening of valve V permits the passage of air from the device 257 and conduit 256 into the mold unit to expel hot interior glass from the mold. When cap 258 is raised a slight distance, valve V closes; then the cap and plunger are raised together to retract the neck pin P.

After the neck pin has been retracted, air under pressure may be admitted to chamber 239 through a conduit 264, Figs. 26 and 27, which leads from a piston valve 265. Such air pressure may serve to blow a parison to shape the bottom thereof as shown in Fig. 20. Subsequently, after the parison is enclosed in the finishing mold F, air under pressure likewise may be supplied from valve 265 to blow the parison to final shape.

If it is desired to withdraw the neck pin P before the air for expelling or emptying glass from the mold is supplied to the mold unit, the volumetric air from the device 257 may be bypassed from conduit 256 to conduit 264 through a conduit 266, Fig. 26, containing a manually controlled valve 267. Thus the air for emptying glass from the mold in the parison forming operation, may flow through chamber 239 into the mold unit around the neck pin, instead of through the tubular plunger 254 past valve V which, in the modified operation, may remain seated.

The operations of the neck pin, and of the air and vacuum supply devices, occur in predetermined order under the control of the timing mechanism T1, associated with the parison forming unit. The operative effect of the timing mechanism T1 in turn is controlled by timer T.

The timer T1 comprises a suitable motor 269, Figs. 23 and 24, on the top of bracket 174, said motor driving a chain 270 which passes around a sprocket wheel 271. Wheel 271 is mounted on worm shaft 272, Figs. 23 and 26, which drives worm gear 273 loosely mounted on cam shaft 274 extending longitudinally of, and suitably journaled on, the base 229.

Cam shaft 274 is intermittently rotated from worm gear 273 by mechanism which, as shown in Figs. 26 and 31, comprises a ratchet wheel 275 connected to gear 273, to which a pawl 276 pivoted on crank arm 277 fast on cam shaft 274, periodically is connected. Pawl 276 is urged into engagement with the teeth of ratchet wheel 275 by a tension spring 278. That provides a driving connection between motor 269 and cam shaft 274. Pawl 276 is tripped out of engagement with ratchet 275 by means of a spring-pressed and fluid pressure operated detent indicated generally at 279, Figs. 23, 24, 31 and 33.

The detent is moved to inoperative position to permit motor 269 to drive cam shaft 274 for the desired period of time, by the admission of air pressure thereto through a conduit 281 which as shown in Fig. 24 leads from the timer T. Upon exhaust of fluid pressure through conduits 281 and the timer, the detent is moved into operative position tripping the pawl 276 out of engagement with ratchet wheel 275 thereby stopping the rotation of the cam shaft. Thus it will be seen that the times at which the cam shaft is rotated and the angular rotation of the cam shaft, may be variably controlled from the timer T.

Cam shaft 274 carries a cam 283, Figs. 26 and 29, for operating the neck pin P and the neck pin valve V; a cam 284 (Figs. 26 and 29) for operating the inside vacuum valve 252; a cam 285 (Figs. 26 and 30) for operating the outside vacuum valve 243; a cam 286 for operating the volumetric air supply device 257; and a cam 287 for operating valve 265 which is adapted to supply parison blowing and/or finish blowing air to the parison forming unit.

Each of the cams 283 to 287 may be made in two parts, one part of which may be fastened to shaft 274 by a set-screw and the other part of which may be adjustably secured to the first part to vary the length of the cam edge and thus change the times of beginning and ending at which the particular mechanism controlled by the cam is operated and/or the period of operation. By means of the set screw, the cam may be adjusted as a whole relative to the cam shaft to vary the time of beginning and ending of operation of the device which the cam controls.

Motion is transmitted from the various cams to effect a complete cycle of operations, preferably during a single rotation of the cam shaft through 360°, in a counterclockwise direction, looking at Figs. 26, 29 and 30.

Motion is transmitted from cam 283 to the neck pin P and neck pin valve V through a bell crank 289 loose on a shaft 290 suitably mounted on base 229. See Figs. 26 and 29. The lower arm of bell crank 289 is connected by links 291, Fig. 29, to the cap 258 on the top of plunger 254, said links being pivoted in the outer ends of pins 259, previously referred to. The upwardly extending arm of bell crank 289 carries a cam roller 292 which engages the cam 283.

Similarly, motion is transmitted from cam 284 to inside vacuum valve 252 through a bell crank 293, Figs. 26 and 29, the downwardly extending arm of which has an adjustable connection with the stem 252a of valve 252, its other laterally extending arm carrying a cam roller 294 which rides on cam 284.

A bell crank 295 on shaft 290 and which includes an upwardly extending arm carrying cam roller 296, Figs. 26 and 30, and a laterally extending arm which carries a screw bolt 297 adjustable therein, (Fig. 27) serves to transmit motion from cam 285 to outside vacuum valve 243.

Cam 286 is engaged by a roller 298 on a bell crank 299 on shaft 290, Figs. 26 and 30, which bell crank is slidably joined to the vertical piston rod 300 of the volumetric air supply device 257. The amount of air supplied by device 257 may be regulated by adjusting a stop screw 301 in the bottom of device 257 (Fig. 30) which changes the intake stroke of piston 302. Air is drawn in by the downward movement of the piston, past a check valve 303 and discharged into conduit 256 past another check valve 304.

Cam 287 operates a lever 305 on shaft 290 carrying cam roller 306 on its upper end, and connected at its lower end to the rod 265a, Figs. 26 and 30, of the piston valve member 265b of valve 265. Valve 265 is provided with an air inlet conduit 265c. When cam roller 306 is engaged by the lobe 287a of cam 287, valve 265 is opened to permit air pressure to flow into conduit 264, thence to chamber 239 in head H, to blow the bottom of a parison to the desired shape. The lobe 287b of cam 287 engages roller 306 to open valve 265 for the introduction of finish blowing air into chamber 239, to blow a parison to final shape in finishing mold F.

The shears comprising the V-notched blades S and S1 are closed and opened by means of an air motor 308, Figs. 23 and 25, to and from the ends of which air pressure is admitted and exhausted through conduits 309 and 310 which, as shown in Fig. 24, lead from the timer T. The blades S and S1 may be suitably mounted in holders 311, Figs. 23 and 25, on vertical rock shafts 312 suitably journaled in a double bearing member 313 secured to the rear side of block 170. Rock shafts 312 carry crank arms 313 on their bottom ends, connected by links 314 to a cross head 315 on the rod of air motor 308. See Figs. 23 and 25. Thus reciprocation of the air motor under control of timer T serves to close and open the shears preferably at the time that the parison mold unit is held in shearing position by cam 189, as previously explained.

The double shears may be replaced by a single shear blade of known type.

In order to support and shape the bottom of a parison as air pressure is applied thereto, bottom closure K, Fig. 24, is located near the finish blowing station. The bottom closure K is carried by the rod 317 of an air motor 318 which raises and lowers the rod and plate K carried thereby, and simultaneously swings the bottom plate into and out of alignment with the parison mold unit, as the result of the cooperation of a pin on rod 317 with a barrel cam 319 surrounding the rod. Air pressure is admitted to and exhausted from the opposite ends of air motor 318 through suitable conduits 320 and 321 leading from the timer T.

If desired, the operation of blowing the parison may be omitted, in wh'ch case bottom closure K may be dispensed with.

The finishing mold F is of the sectional type, the sections of which are carried by holders 322, Figs. 24 and 25, pivoted at 323 on a bracket 324 carried by a channel iron 325 secured to the base 173. Pivotally connected to the holders 322 is a cross head 326 reciprocated to open and close the mold F by an air motor 327 to which a'r is supplied and from which it is exhausted by conduits 328 and 329 leading from timer T.

A bottom closure $K_1$ is provided for the finishing mold, said closure being mounted on an arm 330 pivoted at 331 and held in the path of a push rod 332 mounted in the depending portion 333 of cross head 326 so that operat'ons of air motor 327 serve to raise the bottom closure $K_1$ into a position to be enclosed by the finishing mold F, and to lower the bottom closure into the position in which it is shown in Fig. 24 as the finishing mold is opened, for the discharge of a finished article of glassware.

The operation of the above described apparatus, with the previously stated and other variations, may be as follows:

The parison mold unit is swung over pool G by the action of cam 217, and dipped into the glass under control of cam 189. Vacuum is applied to the mold cavities by valve 243 (Fig. 27) through outside chamber 238, and by valve 252 (Figs. 27 and 29) through inside chamber 239, said valves being operated respectively by cams 285 and 284 (Fig. 26). Thus the mold unit is charged with glass (Fig. 17). Cam 189 then raises the mold unit to the shearing level, during the course of, or after which movement, hot interior glass is expelled from the mold by the supply of a predetermined volume of air from device 257 (operated by cam 286) either past valve V in seated neck pin P, (both operated by cam 283) or through chamber 239, and around the withdrawn neck pin, as already explained, (Fig. 18).

At the appropriate time shears S—S¹, are operated by air motor 308 and the upward movement of the mold unit completed, (Fig. 19). The unit then is swung to the blowing station by cam 217 (Fig. 24) and bottom closure K engages the bottom of mold M as the result of the operation of air motor 318 for the application of blowing air from valve 265 (operated by cam 287) to the parison (Fig. 20). The closure K is disengaged and the parison mold M opened by air motor 220, to leave the parison suspended from the neck mold. The suspended parison then is enclosed by the finishing mold F and blown to final form therein by the operation of valve 265 which permits passage of blowing air through head H. Mold F then is opened and neck mold N parted by operation of air motor 228 to release the finished article. The cycle of operations then is repeated.

As in the case of the first described embodiment of the invention, that last described may be varied both as to the details of the method and the character of the apparatus employed. For example, instead of employing the apparatus shown in Figs. 17 to 33, inclusive, a one or two table rotary machine, may be used as also may a straight line machine of the character disclosed in the copending application of Algy J. Smith, Ser. No. 479,676, filed Sept. 4, 1930, provided of course, that such machines are modified according to the principles of the invention herein disclosed.

The novel method and apparatus of the present invention produce important advantages and results not heretofore obtained in the manufacture of glassware.

Aside from the economical characteristics and the convenience and relative simplicity of the novel method and apparatus, glassware of superior quality may be produced thereby, which possesses both good general distribution and good optical appearance or freedom from waviness and other defects.

The good optical appearance of the glassware may be said to be due, at least in part, to the step of imparting substantially the full length external shape to each quota of glass as it is supplied to the mold, and to the substantial preservation of such external shape during the glass expelling operation and up until the time that the body of glass, whether a parison or completed article, is removed from the mold; to the external shaping of the glass at the time that it is at the maximum homogeneity attainable in practice.

The above treatment of the glass greatly reduces, or altogether prevents, such localized or differential chilling which would cause waviness in the finished ware such as occurs for example in the "feeder" method and produces a settle wave in glassware made by that method. It also reduces surface defects by minimizing sliding contact of the glass with mold surfaces.

The novel method has the further advantage of permitting the formation of a large bubble in each of the pre-shaped glass charges, which bubble is exactly centered and of uniform or uniformly varying diameter, as a result of the uniform chilling action of the mold on the charge. Such advantage aids very materially in obtaining "good general distribution" of glass in the finished ware.

The method of this invention also possesses the highly desirable attribute of weight control of mold charges. Whereas in prior methods, it often is necessary to make special provision for the regulation of the weight and/or size of the quotas of glass delivered to the molds of a forming machine so that the finished glassware will be of the desired capacity, in employing the present invention, no such steps are necessary because when a predetermined volume of air and/or other force is applied to the glass (in accordance with its temperature) to form a cavity or bubble therein of the desired length, the weight of the hollow body eventually formed inevitably is constant for a given size and shape of mold. Therefore, the weight of the hollow body and the corresponding volume of the finished glassware are fixed by the mold, the glass, and the volume of expelling air themselves, and do not depend upon decidedly more delicate critical conditions such as are present in prior methods, and are difficult to control.

It is to be distinctly understood that the invention is not limited to the above described methods and apparatus and that various changes may be made in the sequence of steps in the method, and the manner of performance thereof, as well as in the details of construction of the apparatus, without departing from the scope of the appended claims.

The apparatus shown in Figs. 23 to 33, inclusive, does not per se form part of the present invention but is the invention of Karl E. Peiler, and is substantially disclosed and covered by, apparatus claims in his copending application, Ser. No. 560,428, filed August 31, 1931 concurrently with the filing of the present application. Most of the appended method claims, however, cover more or less broadly, and are generic to, both forms of the fill and empty method herein illustrated, and in like manner both forms of apparatus are covered by broad or generic apparatus claims in this application. Others of the claims herein are specific to the invention illustrated in Figs. 1 to 16, inclusive.

The expression "hollow bodies" or "hollow body" as used in the claims is intended to apply to parisons to be shaped into finished articles by the usual method of finish blowing, as well as to articles completed in a single mold in which the glass initially is shaped, unless otherwise expressly stated.

Having thus described my invention, what I desire to claim and to secure by Letters Patent is:

1. The method of forming a glass parison having a bubble therein, comprising the steps of discharging molten glass from a supply body into a parison mold to fill the cavity of the latter, then introducing blowing pressure into the glass at one end of the mold and exerting a retractive impulse on the glass at the opposite end of the mold by an implement moving in the supply body to aid in forming a bubble in the glass in the mold by the removal of glass therefrom, and thereafter severing the removed glass from that remaining in the mold.

2. The method of forming a partially expanded glass parison which comprises filling the cavity of a parison mold with molten glass from a supply body, introducing fluid under pressure into the glass at one end of the parison mold and exerting a retractive impulse axially of the glass at the opposite end of the parison mold to empty glass from the mold by an implement moving in the supply body, exerting a suction on the glass at the last named end of the mold to prevent the glass therein from being pulled out of contact with the walls of the mold cavity by said retractive impulse, and severing the emptied glass from that in the mold.

3. The method of making glassware which includes the steps of filling a mold substantially full of molten glass, forming a cavity in the glass by expelling a part only of the central core of glass from the mold by a predetermined volume of air under pressure admitted to the opposite end from which the glass enters the mold while the glass in the mold is still connected with the parent body, and severing the glass connecting that remaining in the mold with the parent body.

4. In the manufacture of hollow glassware, the method which comprises the steps of filling a mold substantially full of molten glass, expelling part of the glass from the mold, severing the expelled glass from that remaining in the mold, and introducing blowing pressure into the glass remaining in the mold.

5. In the manufacture of hollow glassware, the method which comprises the steps of filling a mold substantially full of molten glass, emptying a part only of the central core of glass from the mold by applying a predetermined volume of air under pressure thereto and while the remaining glass remains in contact with the walls of the mold cavity throughout substantially the entire area thereof, and severing the emptied glass from that remaining in the mold while the glass is hot and plastic, at least where severing is effected.

6. In the manufacture of hollow bodies of glass, the method which comprises, imparting an external shape corresponding to that of the hollow body desired to a quota of hot molten glass, and chilling the exterior portion of said glass, emptying hot interior glass from within the chilled exterior glass to form the hollow body, disconnecting the chilled exterior glass and the glass removed therefrom, and thereafter applying blowing air to said hollow body to form a hollow article of glassware from said chilled exterior glass.

7. In the manufacture of hollow glass bodies, the method which comprises initially imparting an external shape corresponding to that of the hollow body desired to a quota of glass and chilling the exterior portion of said quota of glass, emptying hot interior glass from within the chilled exterior glass while preserving the external shape initially imparted to the quota of glass to form the hollow body, disconnecting the glass between the hollow body and the hot interior glass which is removed, and applying blowing air to the hollow body to form a hollow article of glassware from the hollow body.

8. In the manufacture of hollow glass bodies, the method which comprises introducing molten glass into an open-bottom mold, initially imparting to the outer part of the glass an external shape corresponding to substantially the entire mold cavity and to that of the hollow body desired, holding the glass in the mold to chill the exterior portion thereof, expelling hot interior glass from the chilled exterior glass through the open bottom of the mold while substantially preserving the external shape initially imparted to the glass to form the hollow body, and disconnecting the glass remaining in the mold from the glass removed therefrom and from within the chilled exterior glass while the glass is hot and plastic at least where disconnected, and making an article of glassware from the hollow body by applying blowing air thereto.

9. In the manufacture of hollow glass bodies, the method which comprises substantially filling an open-bottom mold with molten glass, initially imparting to the outer surface of the glass an external shape corresponding to substantially the entire mold cavity and to the shape of the desired hollow body, retaining the glass in engagement with the mold for a sufficient period of time to materially chill the exterior portion of the glass, expelling hot interior glass from the chilled exterior glass and through the open bottom of the mold while substantially preserving the external shape of the chilled exterior glass to form the hollow body, and while holding the exterior glass against substantial movement relative to the mold wall, disconnecting the hollow glass body thereby formed and remaining in the mold from the glass removed from the mold while the glass is hot and plastic at least where disconnected, and making an article of glassware from the hollow body by applying blowing air thereto.

10. In the manufacture of hollow bodies of glass, the method which comprises charging an open-bottom mold with molten glass by suction, to initially impart to the exterior surface of the glass an external shape corresponding to that of the mold cavity and to the hollow body desired, expelling hot interior glass from within the body thereof through the open bottom of the mold while substantially preserving said external shape of the outer surface of the glass to form the hollow body, severing the expelled glass from that remaining in the mold, and making an article of glassware from the hollow body by applying blowing air thereto.

11. In the manufacture of hollow bodies of glass, the method which comprises charging an open-bottom mold with molten glass by suction, and initially imparting to the outer surface of the glass an external shape corresponding to that of the mold cavity, forming a cavity in the charge by expelling a part only of the hot central core of the charge through the open bottom of the mold while substantially preserving the external shape of the charge by the application of suction to the surface thereof, and severing the expelled glass from that remaining in the mold.

12. In the manufacture of hollow bodies of glass, the method which comprises filling a body mold and an associated neck mold having a neck pin projecting thereinto with molten glass, and imparting a neck finish and an external shape to the glass corresponding to the shape of the molds, holding the neck pin in projected position for the desired period of time to form an interior neck finish and an initial blowing cavity in the glass, retracting the neck pin, subsequently introducing air under pressure into the initial blowing cavity to expel hot interior glass from the body mold, thereby leaving a hollow body in the body mold, severing the glass between the hollow body and the expelled glass, and making an article of glassware from the hollow body by applying blowing air thereto.

13. In the manufacture of hollow bodies of glassware, the method which comprises filling a body mold and an associated neck mold having a neck pin projecting thereinto with molten glass, retaining the glass in said mold for a sufficient period of time to materially chill the exterior thereof and to form a neck finish thereon, retracting the neck pin, thereafter introducing air under pressure through the neck mold and around the neck pin to expel hot interior glass from within the chilled exterior glass and thereby form a hollow body, while retaining the chilled exterior glass in contact with the body mold, disconnecting the hollow body from the expelled glass, and making an article of glassware from the hollow body by applying blowing air thereto.

14. In the manufacture of hollow bodies of glass, the method which comprises filling a mold with a charge of molten glass, and initially imparting to the exterior of the glass an external shape corresponding to that of the mold cavity, holding the glass in contact with the mold for a sufficient period of time to materially chill the exterior portion thereof, and making the glass hollow by applying air to the hot interior glass within the chilled exterior glass in a volume predetermined according to the temperature and viscosity of the glass, and to the volume of the cavity desired in the charge, to expel a part only of the hot central core of the glass, such application of air pressure being effected while the chilled exterior glass is retained in contact with the mold, and disconnecting the glass remaining in the mold from the expelled glass while the glass is hot and plastic at least where disconnected.

15. In apparatus for shaping hollow bodies of glass, the combination of an open-bottom mold, means for filling said mold with molten glass, means for holding the molten glass in contact with the mold for a sufficient period of time to materially chill the exterior of the glass, means for expelling a predetermined portion only of the hot central core of glass from within the chilled exterior glass and from within the mold to form a hollow body, glass severing means, means for operating said glass severing means after the operation of said glass expelling means, for disconnecting the glass remaining in the mold from the expelled glass while the glass is hot and plastic at least where disconnected and means for forming a finished article of glassware from said remaining glass including a bottom mold for forming the bottom of the article, and means for blowing the glass to final form against said bottom mold.

16. In apparatus for fabricating hollow bodies of glass, the combination of an open-bottom mold, means for charging said mold with molten glass by suction, means for retaining said molten glass in contact with the mold for a sufficient period of time to materially chill the exterior of the glass and to impart to the surface thereof an external shape corresponding to that of the mold cavity, means for expelling a predetermined portion only of the hot central core of glass from within the chilled exterior of the glass, means operative during the operation of the last-named means for retaining the chilled exterior glass in contact with the mold cavity, glass severing means, means for operating said glass severing means after the operation of said glass expelling means to disconnect the glass remaining in the mold from the expelled glass, and means for forming a finished article of glassware from said remaining glass including a bottom mold for forming the bottom of the article, and means for blowing the glass to final form against said bottom mold.

17. An apparatus for forming hollow bodies of glass, an open-bottom body mold, a neck mold associated therewith, a neck pin projecting into the neck mold, means for charging said molds with molten glass, said neck mold and body mold operating to chill the exterior portion of the glass charge and to form a neck finish on the charge, and the neck pin serving to form an interior neck finish and an initial blowing cavity in the charge, means for retracting the neck pin, means for thereafter supplying blowing air through the neck mold to expel a part only of the central core of glass from within the chilled exterior glass and through the open bottom of the body mold, glass severing means and means timed to operate said glass severing means after the application of glass expelling air to the charge, to sever the expelled glass from the glass remaining in the body mold.

18. In the manufacture of finished articles of hollow glassware, the method which comprises introducing a charge of hot molten glass into an open-bottom mold and initially imparting the final external shape of the walls of the article desired to the charge, expelling a predetermined portion only of the central core of glass from the interior of the charge and through the open bottom of the mold, and disconnecting the expelled glass from the glass remaining in the mold while the glass is hot and plastic at least where disconnected.

19. The method of making blown glassware which comprises withdrawing molten glass from a source of supply, forming the end portion of the withdrawn glass to provide the neck finish portion of the article to be made, introducing fluid pressure in predetermined volume into the glass through and beyond said neck portion while such glass is attached to the source of supply, to partially form the body of said article of glassware, severing the partially formed body from the source of supply, and subsequently applying blowing air to the partially formed body.

20. The method of making blown glassware which comprises causing molten glass to issue downwardly from a discharge outlet, forming the lower end portion of the issuing glass into the neck portion of an article of hollow glassware, introducing pressure fluid into the issued glass through said neck portion while said glass is still attached to the glass at the outlet, to partially form the body of said article of glassware, severing said partially formed body from the glass at the outlet, closing a blow mold about said partially formed body, and blowing said partially formed body, in the blow mold.

21. The method of forming hollow glassware which comprises withdrawing glass upwardly from the surface of a gathering pool by suction, blowing the glass into hollow form while it remains connected with the glass in the pool, thereafter severing the glass from the glass in the pool to form a parison having a closed bottom, transferring the parison to a finishing mold, and blowing the parison into a finished article in the finishing mold.

22. The method which comprises projecting an elongated blank of plastic glass from a supply body of molten glass, chilling the walls of the blank while the latter is united with the supply body, and blowing a portion only of the glass forming the central core of the blank back into the supply body to form a hollow blank having a closed bottom.

23. The method which comprises projecting an elongated blank of plastic glass from a supply body of molten glass, chilling and solidifying the walls of the blank, and then giving the blank without changing its exterior shape and dimensions, a hollow form by differential pneumatic pressure of predetermined volume applied while the blank is integrally united with the supply body, to expel a portion only of the hot central core of the blank.

24. The method which comprises projecting an elongated blank of glass from a supply body of molten glass, chilling the walls of the blank, and forcing a predetermined portion only of the central core of glass from the interior of the blank back into the supply body by pneumatic pressure while the blank is still integral with the supply body.

GEORGE E. ROWE.

---

Patent No. 1,956,203. April 24, 1934.

GEORGE E. ROWE.

It is hereby certified that error appears in the printed specification of the above numbered patent requiring correction as follows: Page 1, line 32, for "procedure" read procedures; page 11, line 118, for "closure" read plate; page 13, lines 18 and 19, claim 2, strike out the words "to empty glass from the mold" and insert same after "body" in line 20, of same claim; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.

from the surface of a gathering pool by suction, blowing the glass into hollow form while it remains connected with the glass in the pool, thereafter severing the glass from the glass in the pool to form a parison having a closed bottom, transferring the parison to a finishing mold, and blowing the parison into a finished article in the finishing mold.

22. The method which comprises projecting an elongated blank of plastic glass from a supply body of molten glass, chilling the walls of the blank while the latter is united with the supply body, and blowing a portion only of the glass forming the central core of the blank back into the supply body to form a hollow blank having a closed bottom.

23. The method which comprises projecting an elongated blank of plastic glass from a supply body of molten glass, chilling and solidifying the walls of the blank, and then giving the blank without changing its exterior shape and dimensions, a hollow form by differential pneumatic pressure of predetermined volume applied while the blank is integrally united with the supply body, to expel a portion only of the hot central core of the blank.

24. The method which comprises projecting an elongated blank of glass from a supply body of molten glass, chilling the walls of the blank, and forcing a predetermined portion only of the central core of glass from the interior of the blank back into the supply body by pneumatic pressure while the blank is still integral with the supply body.

GEORGE E. ROWE.

---

Patent No. 1,956,203.  April 24, 1934.

GEORGE E. ROWE.

It is hereby certified that error appears in the printed specification of the above numbered patent requiring correction as follows: Page 1, line 32, for "procedure" read procedures; page 11, line 118, for "closure" read plate; page 13, lines 18 and 19, claim 2, strike out the words "to empty glass from the mold" and insert same after "body" in line 20, of same claim; and that the said Letters Patent should be read with these corrections therein that the same may conform to the record of the case in the Patent Office.

Signed and sealed this 19th day of June, A. D. 1934.

Bryan M. Battey (Seal)  Acting Commissioner of Patents.